(12) United States Patent
Singer

(10) Patent No.: US 9,944,154 B2
(45) Date of Patent: *Apr. 17, 2018

(54) PICKUP CAB MOUNT PACK

(71) Applicant: Nicholas J. Singer, Irvine, CA (US)

(72) Inventor: Nicholas J. Singer, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/686,009

(22) Filed: Aug. 24, 2017

(65) Prior Publication Data

US 2017/0349037 A1 Dec. 7, 2017

Related U.S. Application Data

(63) Continuation-in-part of application No. 15/593,657, filed on May 12, 2017, now Pat. No. 9,776,485, which is a continuation of application No. 15/340,157, filed on Nov. 1, 2016, now Pat. No. 9,676,260, which is a continuation of application No. 15/177,268, filed on Jun. 8, 2016, now Pat. No. 9,539,886, which is a continuation of application No. 15/047,519, filed on Feb. 18, 2016, now Pat. No. 9,539,928, which is a continuation-in-part of application No. 14/866,660, filed on Sep. 25, 2015, now Pat. No. 9,365,097, which is a
(Continued)

(51) Int. Cl.
| | |
|---|---|
| *B60J 7/06* | (2006.01) |
| *B60J 7/16* | (2006.01) |
| *B62D 33/04* | (2006.01) |
| *B60J 7/12* | (2006.01) |
| *B60P 7/04* | (2006.01) |
| *B60J 7/04* | (2006.01) |

(52) U.S. Cl.
CPC .............. *B60J 7/062* (2013.01); *B60J 7/041* (2013.01); *B60J 7/065* (2013.01); *B60J 7/12* (2013.01); *B60J 7/1607* (2013.01); *B60P 7/04* (2013.01); *B62D 33/04* (2013.01)

(58) Field of Classification Search
CPC ... B60J 7/041; B60J 7/062; B60J 7/065; B60J 7/12; B60J 7/1607; B60J 7/04; B62D 33/04
USPC ............ 296/100.01, 100.11, 100.15, 100.16, 296/100.17, 100.18, 100.12
See application file for complete search history.

(56) References Cited

U.S. PATENT DOCUMENTS

| | | | | |
|---|---|---|---|---|
| 4,252,363 | A | * | 2/1981 | Rodrigue ................... B60J 5/14 160/84.01 |
| 4,273,377 | A | * | 6/1981 | Alexander ............... B60J 7/062 296/100.12 |

(Continued)

OTHER PUBLICATIONS

Diamondback Automative Accessories, Inc. Owner's Manual HD Truck Cover, DiamondBack Truck Covers (Manual), published at least as early as 2008.
(Continued)

*Primary Examiner* — Joseph D. Pape
(74) *Attorney, Agent, or Firm* — Stetina Brunda Garred and Brucker

(57) ABSTRACT

A cover for a truck bed that can be horizontally traversed between expanded and collapsed positions is shown. Since the cover is horizontally traversed, the person manipulating the cover need not lift the cover vertically in order to reconfigure the cover between the expanded and collapsed positions. Women and elderly people who are generally not as strong as men can manipulate the cover.

10 Claims, 25 Drawing Sheets

Related U.S. Application Data continuation-in-part of application No. 14/626,731, filed on Feb. 19, 2015, now abandoned.

(56) References Cited

U.S. PATENT DOCUMENTS

| | | | | |
|---|---|---|---|---|
| 4,789,196 A * | 12/1988 | Fields | ............... | B60J 7/062 296/100.04 |
| 4,828,315 A * | 5/1989 | Muirhead | ............ | B60J 7/106 296/10 |
| 5,443,295 A * | 8/1995 | Moberly | ............ | B60J 7/062 160/180 |
| 5,531,497 A * | 7/1996 | Cheng | ............... | B60J 7/061 296/100.01 |
| 5,845,957 A * | 12/1998 | Hurst | ............... | B60J 7/062 135/88.09 |
| 5,924,762 A * | 7/1999 | Pols | ............... | B60P 3/36 296/166 |
| 5,951,092 A * | 9/1999 | Cissell | ............... | B60J 7/102 296/100.12 |
| 6,942,275 B2 * | 9/2005 | Corbett | ............... | B60J 7/102 296/100.16 |
| 9,365,097 B1 | 6/2016 | Singer | | |
| 9,539,886 B2 | 1/2017 | Singer | | |
| 9,539,928 B2 | 1/2017 | Singer | | |
| 9,676,260 B2 | 6/2017 | Singer | | |
| 2010/0026037 A1 * | 2/2010 | Opie | ............... | B60J 7/062 296/100.12 |
| 2017/0246938 A1 | 8/2017 | Singer | | |

OTHER PUBLICATIONS

Agri-Cover, Inc., Installation Instructions and Owner's Manual, Access Original Slantback Roll-up Cover (Manual), published at least as early as 2014.

Snugtop the Perfect Fit, Installation Instructions (Manual), published at last as early as 2015.

* cited by examiner

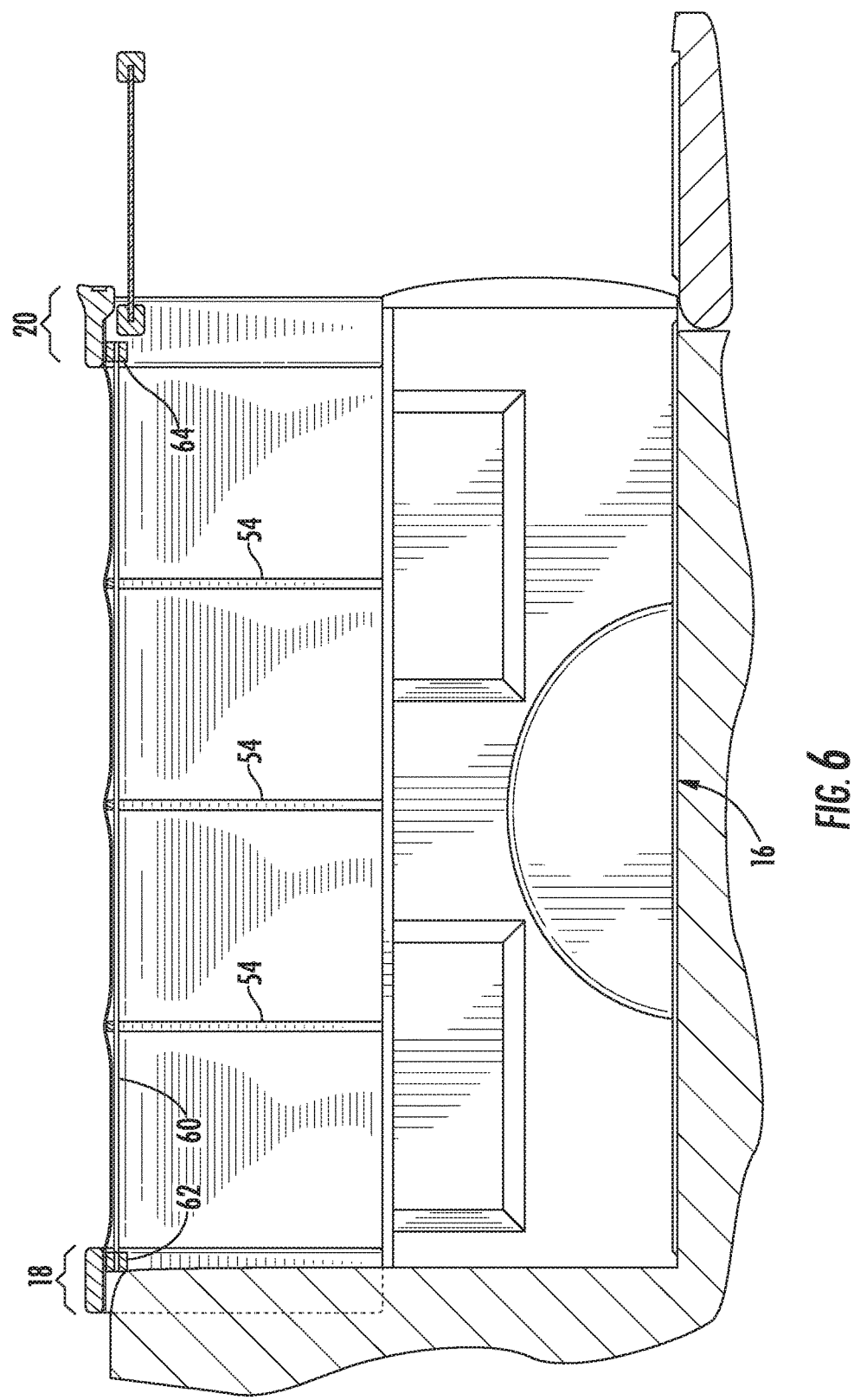

PICKUP CAB MOUNT PACK

CROSS-REFERENCE TO RELATED APPLICATIONS

The present application is a continuation in part of U.S. patent application Ser. No. 15/593,657, filed on May 12, 2017 which is a continuation of U.S. patent application Ser. No. 15/340,157, filed on Nov. 1, 2016, which is a continuation of U.S. patent application Ser. No. 15/177,268, filed on Jun. 8, 2016, which is a continuation of U.S. patent application Ser. No. 15/047,519, filed on Feb. 18, 2016, which is a continuation in part application of U.S. patent application Ser. No. 14/866,660, filed on Sep. 25, 2015 which is a continuation-in-part patent application of U.S. patent application Ser. No. 14/626,731, filed Feb. 19, 2015, the contents of both patent application which are expressly incorporated herein by reference.

STATEMENT RE: FEDERALLY SPONSORED RESEARCH/DEVELOPMENT

Not Applicable

BACKGROUND

The various embodiments and aspects described herein relate to an accessory for a truck bed.

Various accessories exist for truck beds in order to increase the utility of the truck bed. By way of example and not limitation, a hard shell for a truck bed may be installed on the truck bed in order to create an enclosed space. The enclosed space is protected from the environment and may provide minimal security. Other options such as a flat cover may be mounted to the upper periphery of the truck bed. However, these solutions are generally permanent in the sense that the hard shell and flat cover cannot be easily removed when an open truck bed is desired. For example, when moving furniture or other large items, it would be desirable that a flat cover and hard shell not be mounted to the truck bed so that the truck bed can carry the oversized item. Unfortunately, these semi-permanent flat cover and hard shell options are difficult to remove due to weight and other factors.

Accordingly, there is a need in the art for an improved cover for a truck bed.

BRIEF SUMMARY

The various embodiments and aspects described herein address the needs discussed above, discussed below and those that are known in the art.

A collapsible truck bed cover may be mounted to a truck bed. The collapsible truck bed cover is traversable between expanded and collapsed positions. The traversal of a collapsible truck bed cover is horizontal, and thus, does not require great strength in order to traverse the cover between the expanded and collapsed positions. The user need only slide the cover in the horizontal direction. As such, smaller framed people or those that are not as strong can easily traverse the cover to the collapsed position when an open bed is desired or easily traverse the cover to the expanded position when an enclosed space is desired.

More particularly, a collapsible cover for a bed of a truck is disclosed. The cover may comprise first and second rails, first and second rigid members, a middle portion, a plurality of rigid frame members or support structures and a latch.

The first and second rails may be attached to first and second sidewalls of the bed of the truck. The first rigid member of the cover may be attached to a forward portion of the bed of the truck. The first rigid member may have an inverted U shaped configuration corresponding to outer walls and a roof of a cab of the truck. The second rigid member of the cover may be slidably connected to the first and second rails which are attached to first and second sidewalls of the bed of the truck. The second rigid member may have the inverted U shaped configuration. The second rigid member may be horizontally slidable between collapsed and expanded positions. The second rigid member may be disposed closer to the first rigid member than a tailgate of the bed of the truck when the second rigid member is at the collapsed position. The second rigid member may be disposed closer to the tailgate of the bed of the truck than the first rigid member when the second rigid member is at the expanded position. The middle portion may be fabricated from a flexible sheet and configured to have the inverted U shape configuration. The first end portion of the middle portion may be attached to the first rigid member and a second end portion of the middle portion may be attached to the second rigid member. The middle portion may be traversed between collapsed and expanded configurations. In the collapsed configuration, the middle portion may be folded on each other and tucked under the first and/or second rigid members. In the expanded configuration, the second rigid member may be at the expanded position and the middle portion may be stretched out between the first and second rigid members.

The plurality of rigid frame members may be configured to have the inverted U shaped configuration. The plurality of rigid frame members may be intermittently attached to the middle portion to support the middle portion when the middle portion and the second rigid member are at the expanded position. The plurality of rigid frame members may be horizontally slideably connected to the left and right rails which are attached to the left and right sidewalls of the bed of the truck. The latch may be attached to the first and second rigid members for securing the second rigid member at the collapsed position and the middle portion in the collapsed configuration.

The second rigid member may be releasably latched to the first rigid member. The second rigid member may have a window pivotable about an upper portion of the second rigid member. The window may be latched to either the tailgate or sides of the second rigid member.

The first and second end portions of the shell may be sealed to the first and second rigid members so as to be waterproof.

The second rigid member may further comprise a handle for gripping the second rigid member when the second rigid member is being traversed either to the collapsed position or the expanded position.

The cover may defined an enclosed space over the truck bed when the cover is mounted to the truck bed and the cover traversed to an expanded position.

The first and second rigid members may be fabricated from a fiberglass material, carbon fiber material, aluminum, steel, metallic material or combinations thereof.

The middle portion of the cover may extend over the first and second sidewalls of the truck bed. The first rigid member may have a skirt that extends over the first and second sidewalls of the truck bed from first and second side walls of the first rigid member. The cover may further comprise a seal that extends outward and creates a barrier with the cab.

In another aspect, a method of reconfiguring a cover for a truck bed between a covered configuration and an open bed configuration is disclosed. The method may comprise the steps of unlatching first and second rigid members from each other from a collapsed position, each of the first and second rigid members having an inverted U shaped configuration; horizontally sliding the second rigid member away from the first rigid member; locking the second rigid member in an expanded position.

In the method, the unlatching step may include the step of actuating a lever to unlatch the first and second rigid members from each other. The horizontal sliding step may include the step of sliding the second rigid member over ball bearings incorporated into the first and second rails.

According to another embodiment, a collapsible truck cover for a bed of a truck includes a first rigid member that is attachable to a rearward portion of a cab of a truck. The first rigid member may be of a configuration corresponding to the outer walls and roof of the cab. The first rigid member may include a first set of apertures configured to be aligned with a corresponding second set of apertures formed on the cab.

The truck cover may include a plurality of mechanical fasteners, wherein each mechanical fastener may be advanced through a respective one of the first set of apertures, and a corresponding respective one of the second set of apertures for securing the first rigid member to the cab.

The first end portion of the middle portion may be adapted to be captured between the first rigid member and the cab when the first rigid member is attached to the cab.

The method may further comprise the step of fixedly mounting the first rigid member to the truck bed.

According to yet another embodiment, there is provided a collapsible cover for a bed of a truck. The cover comprises first and second rails attachable to respective first and second sidewalls of the bed of the truck. A first rigid member of the cover is fixedly securable to a cab of the truck such that the first rigid member is substantially immovable relative to cab when secured thereto. The first rigid member is of a configuration corresponding to outer walls and a roof of the cab of the truck. A second rigid member of the cover is slidably connected to the first and second rails. The second rigid member is of a complimentary configuration relative to the first rigid member. The second rigid member is horizontally slidable between collapsed and expanded positions, with the second rigid member being closer to the first rigid member than a tailgate of the bed of the truck when the second rigid member is at the collapsed position, and the second rigid member being closer to the tailgate of the bed of the truck than the first rigid member when the second rigid member is at the expanded position. A middle portion is fabricated from a flexible sheet, with a first end portion of the middle portion being attached to the first rigid member and a second end portion of the middle portion being attached to the second rigid member. The middle portion is traversable between collapsed and expanded configurations. In the collapsed configuration, the middle portion is tucked under the first and/or second rigid members, and in the expanded configuration, the second rigid member is at the expanded position and the middle portion being stretched out between the first and second rigid members. A plurality of rigid frame members are intermittently attached to the middle portion to support the middle portion when the middle portion and the second rigid member are at the expanded configuration and expanded position, respectively. The plurality of rigid frame members are horizontally slideably connected the left and right rails attachable to the left and right sidewalls of the bed of the truck. A latch is integrated into the second rigid member for securing the second rigid member at the collapsed position and the middle portion in the collapsed configuration.

According to still another embodiment, there is provided a vehicle comprising a cab having a forward end portion, a rear wall opposite the forward end portion, and a roof having an overhang portion extending away from the forward end portion beyond the rear wall, with the rear wall and the overhang portion collectively defining a cab cavity. A bed extends from a rear portion of the cab and includes opposed first and second sidewalls. A collapsible cover is coupled to the cab and includes a rigid member slidably connected to the first and second sidewalls of the bed and being selectively transitional between collapsed and expanded positions. The rigid member moves closer to the cab as the rigid member transitions from the expanded position toward the collapsed position. A flexible portion is fabricated from a flexible sheet and includes a first end portion fixedly securable to the rear wall of the cab and a second end portion attached to the rigid member. The flexible portion is traversable between collapsed and expanded configurations in response to transition of the rigid member between the collapsed and expanded positions, respectively, with the second end portion moving away from the cab as the flexible portion transitions from the collapsed configuration toward the expanded configuration. An attachment member is securable to the first end portion of the flexible portion and the rear wall of the cab for fixedly securing the flexible portion to the rear wall of the cab. A plurality of rigid frame members are intermittently attached to the flexible portion to support the flexible portion when the flexible portion and the rigid member are at the expanded configuration and expanded position, respectively. A latch is integrated into the second rigid member for securing the second rigid member at the collapsed position.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 6 is a cross-sectional view of the truck bed cover traversed to the expanded position of the rod for stabilizing the second rigid member;

DETAILED DESCRIPTION

Figure 1:
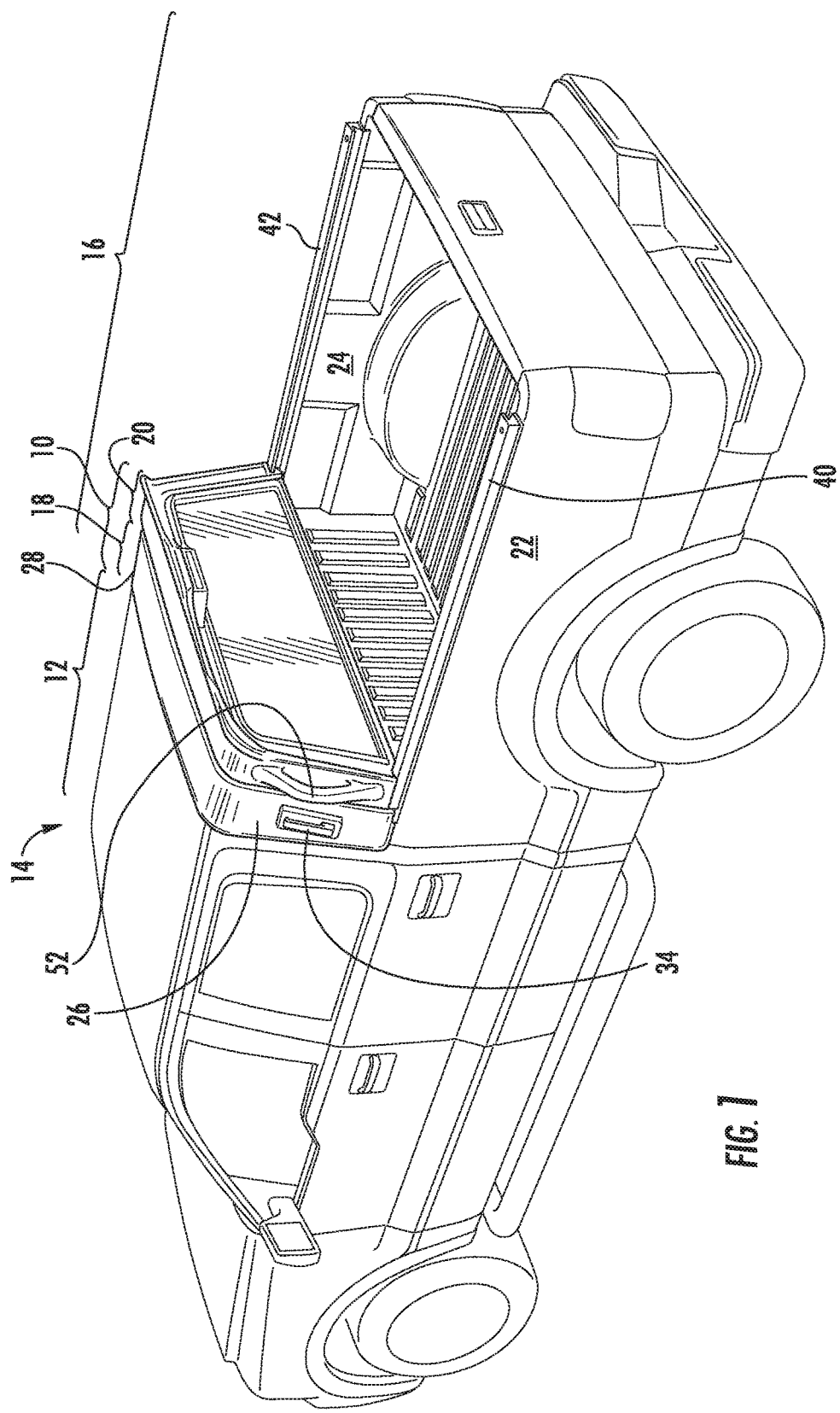
FIG. 1 is a perspective view of a truck with a cover in a collapsed position mounted to a truck bed.

Referring now to the drawings, a collapsible truck bed cover 10 is shown. The cover 10 is traversable between a collapsed position (see FIG. 1) and an expanded position (see FIG. 3). In the collapsed position, the cover 10 is compact and disposed immediately adjacent a cab 12 of the truck 14. In the expanded position, the cover 10 is spread open over an entire length of a bed 16 of the truck 14. The cover 10 can be locked in the collapsed position or the expanded position depending on the use desired or its normal preferred default position. Additionally, the cover 10 by being horizontally collapsible allows the driver to deploy the cover 10 to the expanded position and vice versa without much effort of time and strength. Accordingly, smaller framed people such as women and the elderly would be able to easily traverse the cover 10 in the horizontal direction between the collapsed and expanded positions to configure the cover 10 depending on the use of the truck bed 16. Smaller framed people would not be able to remove a heavy flat cover or hard shell from a truck bed 16. Smaller framed people need not commit themselves to having a prior art heavy hard shell or prior art cover permanently mounted to the bed 16 of the truck 14 or leaving the bed 16 open for receiving larger items. The user can keep the cover 10 in the collapsed position in order to take advantage of the full benefit of an open bed 16 of the truck 14. Alternatively, the user can easily traverse the cover to the expanded position in order to provide an enclosed space over the bed 16 of the truck 14. The traversal of the cover 10 between the collapsed and expanded positions is horizontal. As such, the user need not lift the cover 10 up or down. As such, even smaller framed people can reconfigure the cover 10 as desired, namely, to the collapsed position for an opened bed configuration or to the expanded position for an enclosed space.

More particularly, referring now to FIG. 1, the cover 10 may have first and second rigid members 18, 20. The first and second rigid members 18, 20 may have a generally inverted U-shaped configuration. Both the first and second rigid members 18, 20 are securable to the first and second side walls 22, 24 of the truck bed 16. The first rigid member 18 is rigidly fixed to the first and second side walls 22, 24 of the truck bed 16. By way of example and not limitation, the lower distal end portions of the first rigid member 18 may be bolted to upper surfaces or lips of the first and second side walls 22, 24. In this regard, the upper surfaces or lips of the first and second side walls 22, 24 of the truck bed 16 may be drilled to form a hole through which the bolts are used to hold the first rigid member 18 down onto the upper surfaces or lips of the first and second side walls 22, 24. Alternatively, the first rigid member 18 may have a clamping mechanism which does not require a through hole to be drilled through the lips of the first and second side walls 22, 24 of the truck bed 16. Instead, the clamping mechanism reaches under the lips of the left and right side walls 22, 24 and draws the first rigid member 18 downward in order to clamp the first rigid member 18 to the lips of the first and second side walls 22, 24. Moreover, the lower distal end portions of the first rigid member 18 may be sized and configured to have a corresponding shape and size of the truck bed. A seal may be disposed between the lower distal end portions of the first rigid member 18 and the upper surfaces or lips of the first and second side walls 22, 24 of the truck bed 16. The seal may be a rubberized gasket. Alternatively, the lower distal end portions of the first rigid member 18 may have a skirt which overhangs the first and second side walls 22, 24 so that water cascades off of the first rigid member 18 and onto the skirt and onto the first and second side walls 22, 24.

Additionally, the first rigid member 18 may have a rubber gasket that extends outward toward the cab 12 and forms a seal therewith in order to prevent or substantially eliminate rainwater from entering the enclosed space under the cover 10 when the cover 10 is traversed to the expanded position. When the cover 10 is installed on the truck bed 16, the first rigid member 18 does not move and remains stationarily fixed and attached to the truck bed 16.

The first rigid member 18 may have first and second side walls 26, 28. The second side wall 28 is not fully shown in the drawings but has a mirror image of the first side wall 26 about a vertical plane located at a midpoint of the first rigid member 18. The first rigid member 18 may have two latches that are used to secure the second rigid member 20 in the collapsed position shown in FIG. 1. The latches hold the first and second side walls 30, 32 of the second rigid member 20 to the first and second side walls 26, 28 of the first rigid member 18 to ensure that the second rigid member 18 remains in the collapsed position while the automobile is being driven and also during minor accidents. The latches can be disengaged by levers 34 on the first and second sidewalls 26, 28. The lever 34 on the second side wall 28 of the first rigid member 18 is not shown but is identical to the lever 34 mounted to the first side wall 26.

The first and second rigid members 18, 20 may be fabricated from fiberglass, carbon fiber, aluminum, steel, metallic materials and other materials that are known in the art or developed in the future that are weather resistant and substantially rigid in order to allow for minor impacts without cracking or breakage.

Figure 2:
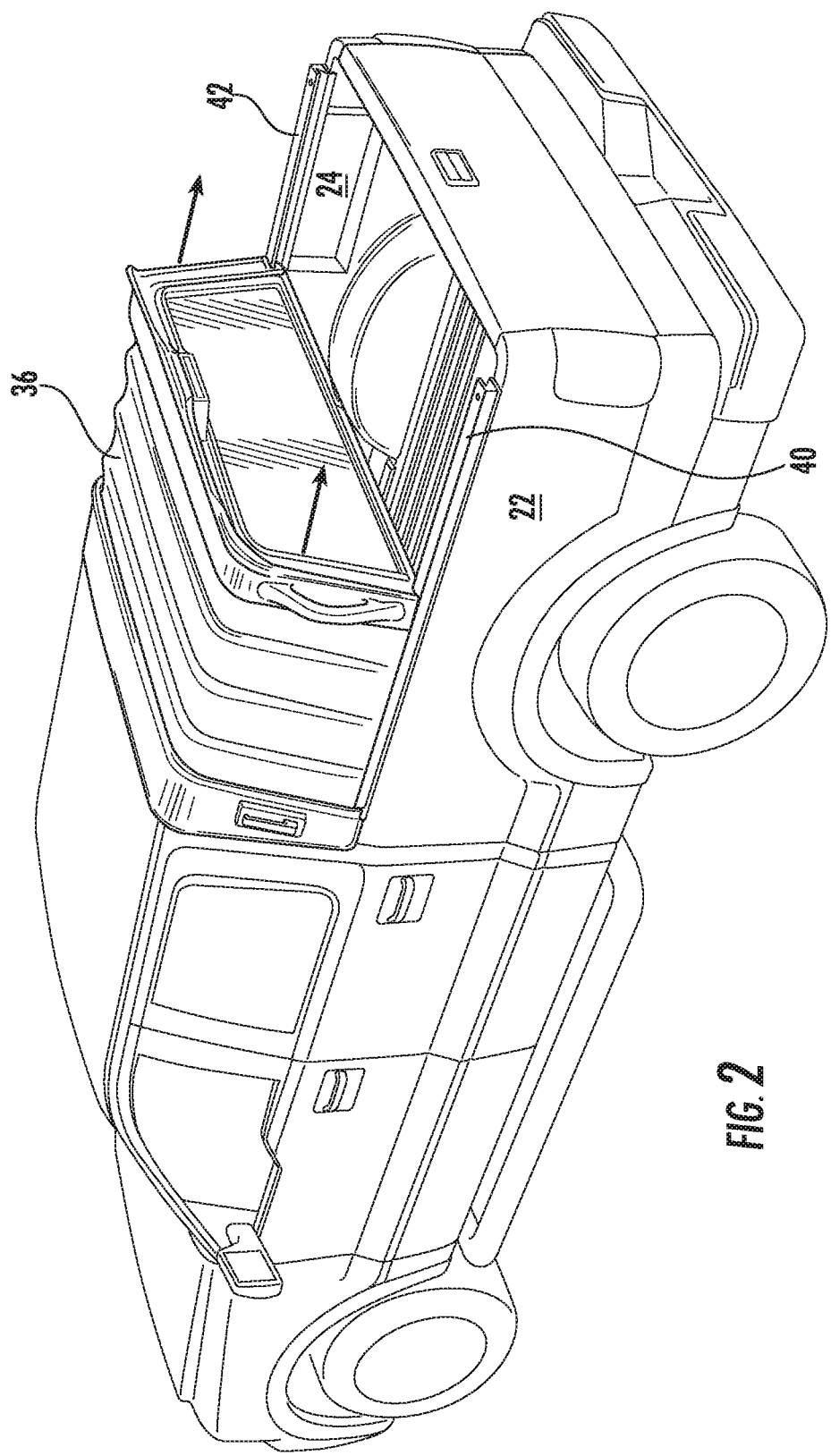
FIG. 2 illustrates the cover being traversed to an expanded position.
Figure 3:
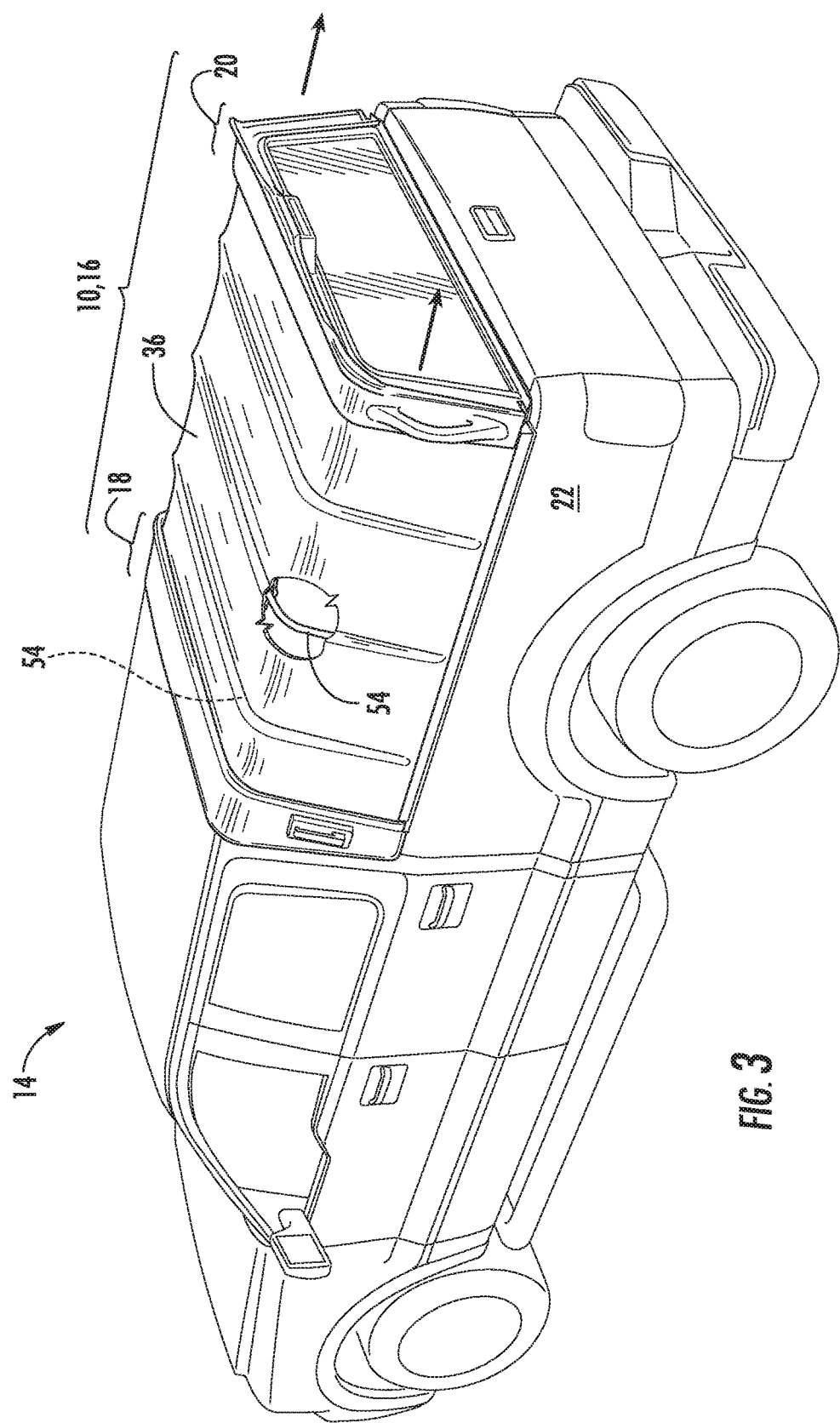
FIG. 3 illustrates the cover at the expanded position.

The second rigid member 20 may have a shape that corresponds to the shape of the first rigid member 18. Moreover, the first and second rigid members 18, 20 may have a shape that corresponds to an outer shape of the cab 12 of the truck 14. The height of the first and second rigid members 18, 20 may be at about the same height of a roof of the cabin 12 or may be up to about 12 to 24 inches higher than the roof of the cab 12. When the second rigid member 20 is traversed to the expanded position, the first and second rigid members 18, 20 and the shell 36 form an enclosed volume over the truck bed 16. The second rigid member 20 is slidably attached to the first and second side walls 22, 24 of the truck bed 16, as shown in FIGS. 2 and 3. In particular, first and second rails 40, 42 are secured to the upper surfaces or lips of the first and second side walls 22, 24 of the truck bed 16. The first and second rails 40, 42 may be secured thereto by being bolted thereto or clamped to upper lips of the first and second side walls 22, 24 of the truck bed 16.

Figure 4:
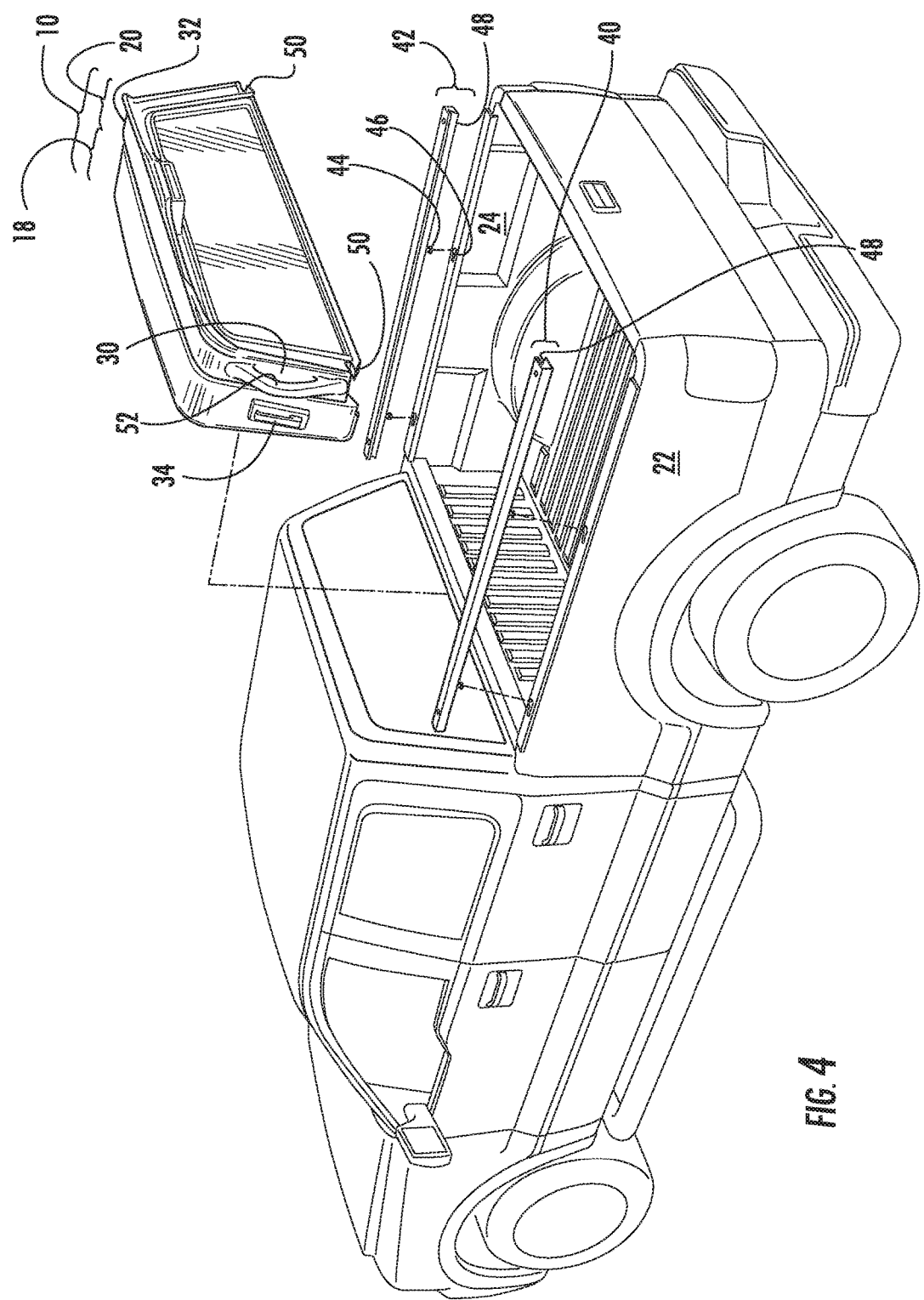
FIG. 4 is an exploded perspective view of the cover, rails and truck bed.
Figure 5:
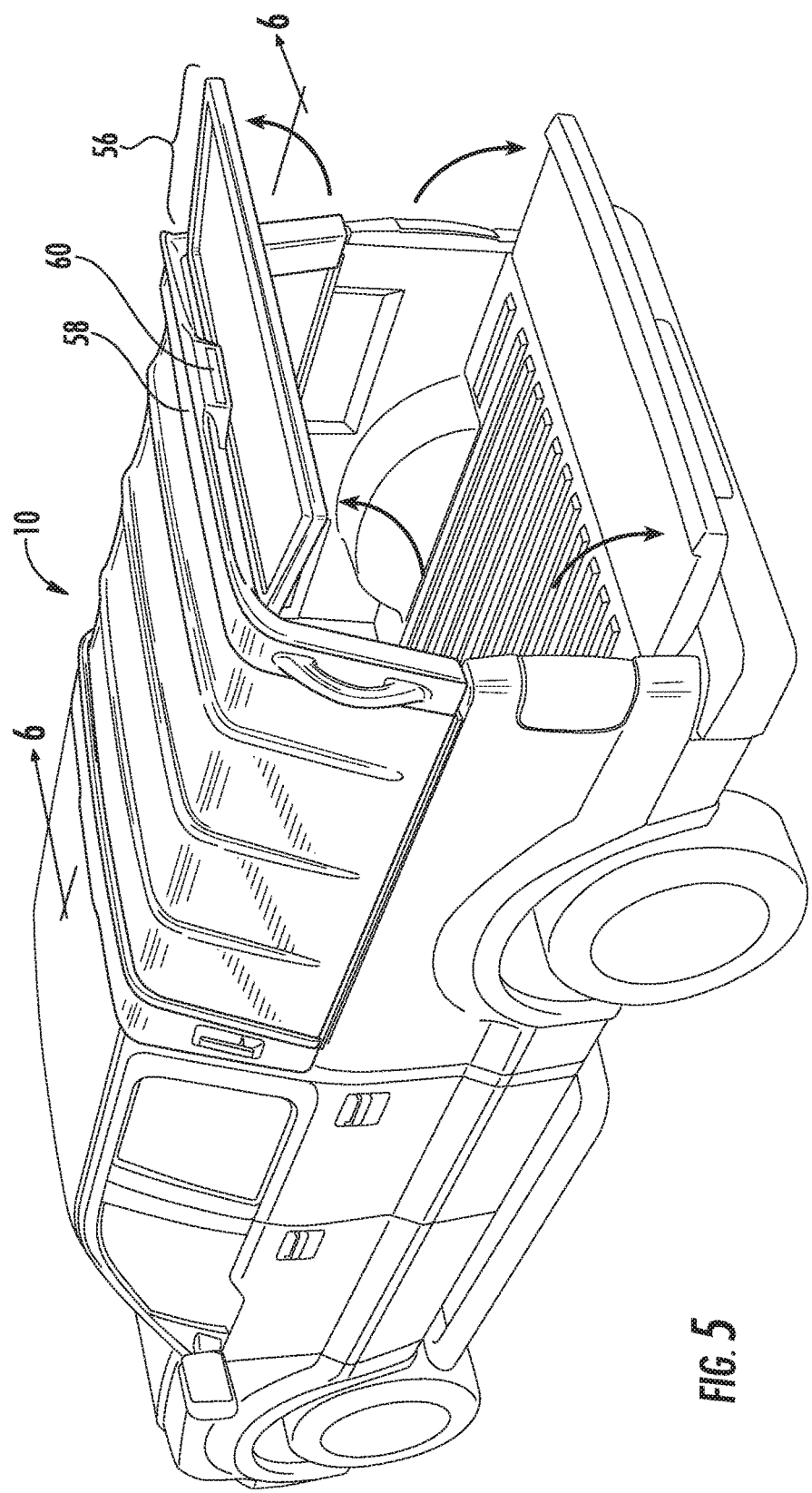
FIG. 5 illustrates the cover in the expanded position with a window and tailgate in an opened position.

Referring now to FIG. 4, the first and second rails 40, 42 may have an enlarged nub 44 that is inserted into a keyhole shaped slot 46 formed in the sidewalls 22, 24. The enlarged nubs 44 are inserted into the keyhole shaped slots 46 and slid into position to prevent removal of the first and second rails 40, 42 off of the first and second side walls 22, 24 of the truck bed 16. Other alternatives for attaching the rails 40, 42 to the lips of the sidewalls 22, 24 that are known in the art may also be used, such as clips, adhesives, clamps, etc. The first and second rails 40, 42 have an elongate groove 48. The elongate grooves 48 of the first and second rails 40, 42 have a wedge-shaped cross-sectional configuration that meets with a corresponding shaped protrusion 50 formed on the lower distal end portions of the second rigid member 20. The protrusions 50 have a tight fit within the grooves 48 so that the second rigid member 20 does not excessively rattle or shake when the second rigid member 20 is traversed to the expanded position. However, the fit between the protrusion 50 and the groove 48 is loose to allow the second rigid member 20 to be easily traversed back and forth by hand between the expanded and collapsed positions. The first and second rails 40, 42 may also be retrofitted with ball bearings that support the weight of the second rigid member 20 to further facilitate ease of horizontal traversal between the collapsed and expanded positions. By doing so, the cover 10 can remain permanently on the truck bed 16 and allow the user to store the cover 10 in the collapsed position when a large object is placed in the truck bed 16. Also, the cover 10 can be easily traversed to the expanded position when an object is placed on the truck bed 16 and needs to be protected from the environment or hidden from sight.

The second rigid member 20 may also have handles 52. The handle 52 on the second side wall 32 of the second rigid member 20 is not shown but may be identical to the handle 52 shown on the first side wall 30 of the second rigid member 20. Handles 52 may be gripped by a person to aid the person in easily sliding the second rigid member 20 between the expanded and collapsed positions by hand.

As shown in FIG. 3, the cover 10 forms an enclosed volume over the truck bed 16. The enclosed volume is partially defined by the first and second rigid members 18, 20. However, a majority of the enclosed space is defined by shell 36 that can be extended when the second rigid member 20 is traversed to the expanded position. The shell 36 is a flexible sheet material made to be waterproof. The shell 36 may extend from the first side wall 22 to the second side wall 24 and lap over the first and second side walls 22, 24 of the truck bed 16 so that rainwater or water that falls on top of the shell 36 can cascade off of the shell 36 and onto the first and second side walls 22, 24. The shell 36 is supported by a plurality of support structures 54. The shell 36 is draped over the support structures 54 so that the shell 36 is not supported merely by tension between the first and second rigid member 18, 20 and does not sag downward. The support structures 54 are secured to the shell so that the shell 36 slides the support structures 54 along the first and second rails 40, 42. The support structures 54 may be slidably attached to the first and second rails 40, 42 in the same manner that the second rigid member 20 is slidably attached to the first and second rails 40, 42. In particular, the support structures 54 may have a protrusion that extends into the grooves 48 of the first and second rails 40, 42. The shell 36 may also be hermetically sealed to the first and second rigid members 18, 20.

In the collapsed position shown in FIG. 1, the shell 36 and plurality of support structures 54 are tucked under the first and/or second rigid members 18, 20. As such, even though the support structures 54 have a similar configuration compared to the first and second rigid members 18, 20, namely an inverted U-shaped configuration, the support structures 54 are smaller than the first and second rigid members 18, 20 so that the support structures 54 can be tucked under the first and/or second rigid members 18, 20 when the cover 10 is traversed to the collapsed position. In this regard, a length of the first and/or second rigid members 18, 20 is sufficient to tuck the shell 36 and the plurality of support structures 54 thereunder. By way of example and not limitation, the length of the first rigid member 18 may be about 4 to 12 inches and the length of the second rigid member 18 may also be about 4 to 12 inches.

The cover 10 may also have a window 56 that is pivotable about an upper horizontal section 58 of the second rigid member 20. The window 56 is pivotable to an up position shown in FIG. 4 or a down position shown in FIG. 1. In the up position, the window 56 can be biased to the up position by a shock or other support known in the art or developed in the future. Moreover, in the down position shown in FIG. 1, a latch may be engaged in order to lock the window 56 in the down position while driving and also to provide minimal security for the volume defined by the truck bed 16 and cover 10 when the cover 10 is traversed to the expanded position.

As discussed above, the second rigid member 20 may be locked in the expanded position so that the cover 10 does not collapse while driving or during minor accidents. In order to lock the second rigid member 20 to the expanded position, the lower distal end portions of the second rigid member 20 may have a clamp that is removably attachable to the lips of the first and second side walls 22, 24 of the truck bed 16. The clamp is engaged to the lips of the first and second side walls 22, 24 of the truck bed when it is desired that the cover 10 be locked in the expanded position. In order to traverse the second rigid member 20 to the collapsed position, the clamp is removed so that the second rigid member 20 can be traversed toward the first rigid member 18. Alternatively, triggers can be incorporated into the handles 54 that actuate the clamp via existing triggers and clamps known in the art or developed in the future.

In use, the rails 40, 42 are mounted to the first and second side walls 20, 24 of the truck bed 16. Moreover, the cover 10 is mounted to the truck bed 16 and the first and second rails 40, 42. The cover 10 can be traversed to the collapsed position and remain in the collapsed position until it is desired for the cover 10 to be traversed to the expanded position. In the collapsed position, the driver or user can utilize the full area of the truck bed 16 for carrying large objects and for conveniently placing objects on or taking objects out of the truck bed 16. If the user wants to form an enclosed area above the truck bed 16, the user can traverse the cover 10 to the expanded position. At which time, the user unlocks the latch by activating the levers 34. The handles 52 are gripped and traversed toward the tailgate to move the second rigid member 20 away from the first rigid member 18, as shown in FIG. 2. This can be a one or two man operation. For a two-man operation, each person can activate the lever 34 to disengage the latch and grab the handle 52 and slowly slide the second rigid member 22 to the expanded position. Once the second rigid member 20 is in the expanded position, the second rigid member can be locked in place as shown above. Conversely, to traverse the second rigid member 22 to the collapsed position, the user releases the clamping mechanism used to lock the second rigid member 22 in the expanded position. The user grips the handle 52 and slowly slides the second rigid member 22 to the collapsed position. At the collapsed position, the latches which are activated by levers 34 secure the first and second rigid members 22, 24 together.

The cover 10 may also have a third taillight 60 electrically connected to the electrical system of the truck 14 and operative to illuminate when a brake pedal of the truck 14 is depressed.

Referring now to FIG. 6, the first and second rigid members 18, 20 are disposed at opposite ends of the truck bed 16 in the expanded position. The upper ends of the first and second rigid members 18,20 may be braced with a rod 60. The rod 60 has a distal end that is insertable into a fixture 62 that protrudes downward from an interior side of the first rigid member 18. The rod 60 extends to a second fixture 64 and is insertable into the second fixture 64 and secured thereto by way of a set screw or other mechanism known in the art or developed in the future for securing the rod 60 into the fixture 64. The fixture 64 may extend downward from an interior of the second rigid member 20. The fixtures 62, 64 may be a protrusion with a through hole or recess which can receive the rod 60. Another means for securing the rod 60 to the fixtures 62, 64 contemplates a reduced diameter pin at the distal portion of the rod 60 which fits within a hole of the fixture 62. The reduced diameter pin of the rod 60 at the distal portion thereof is freely rotatable within the hole of the fixture 62. The upper end of the second rigid member 20 may be slightly moved backwards so that a proximal portion of the rod 60 can be inserted into a threaded hole of the fixture 64. The proximal portion of the rod 60 may be threaded and mate with the threaded hole formed in the fixture 64. The rod 60 may be rotated to thread the proximal threaded portion of the rod 60 into the threaded hole of the fixture 64. Thereafter, lock nut 66 may be tightened in order to prevent the proximal threaded portion of the rod 60 from coming loose out of the threaded hole of the fixture 64. The rod 60 provides rigidity to the second rigid member 20 so that the second rigid member 20 does not sway or move while driving and also during minor accidents.

Figure 7A:
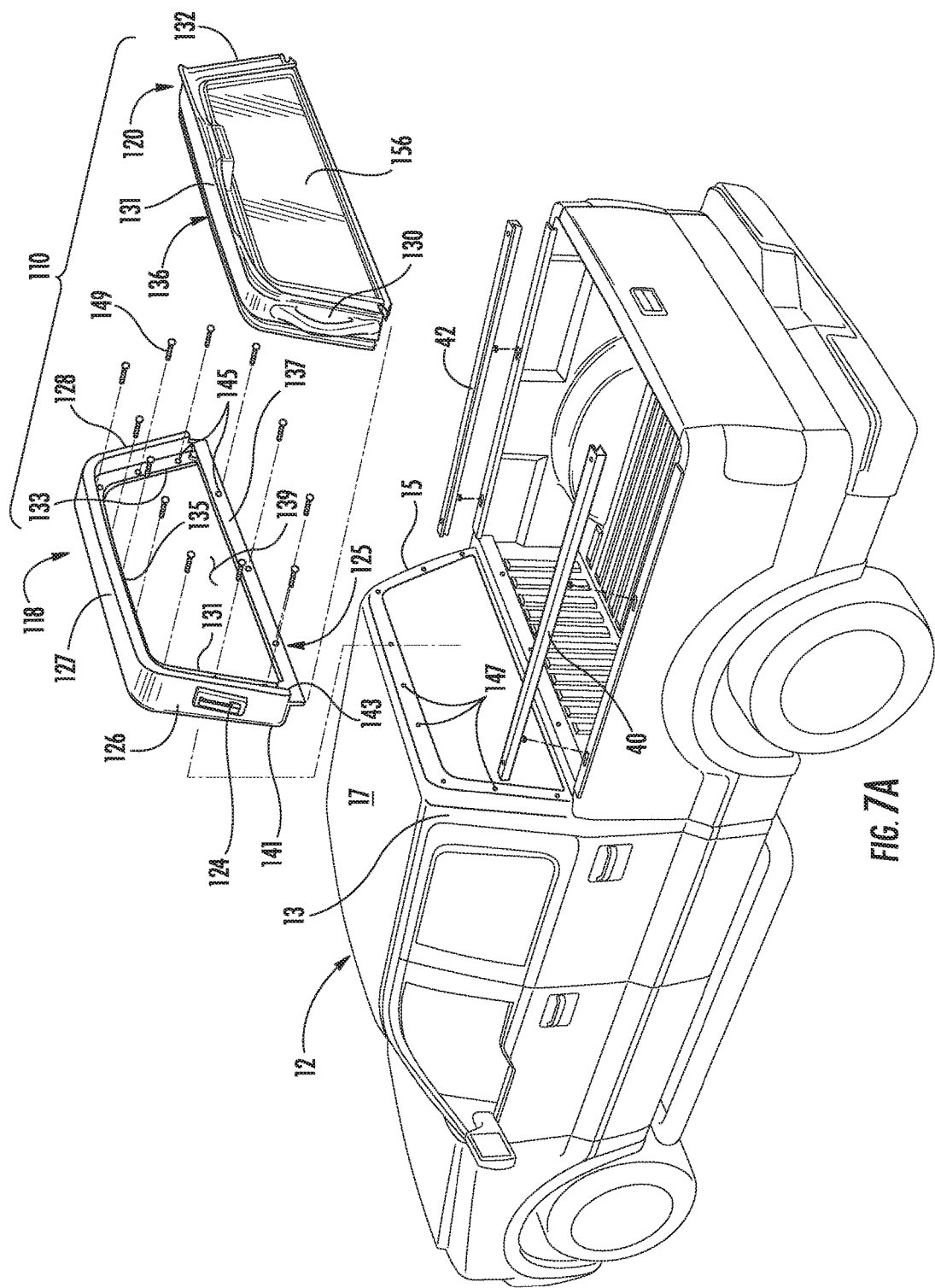
FIG. 7A is an upper perspective, partially exploded view of a second embodiment of a truck bed cover adapted to be attached to a rearward portion of a cab of a truck.
Figure 7B:
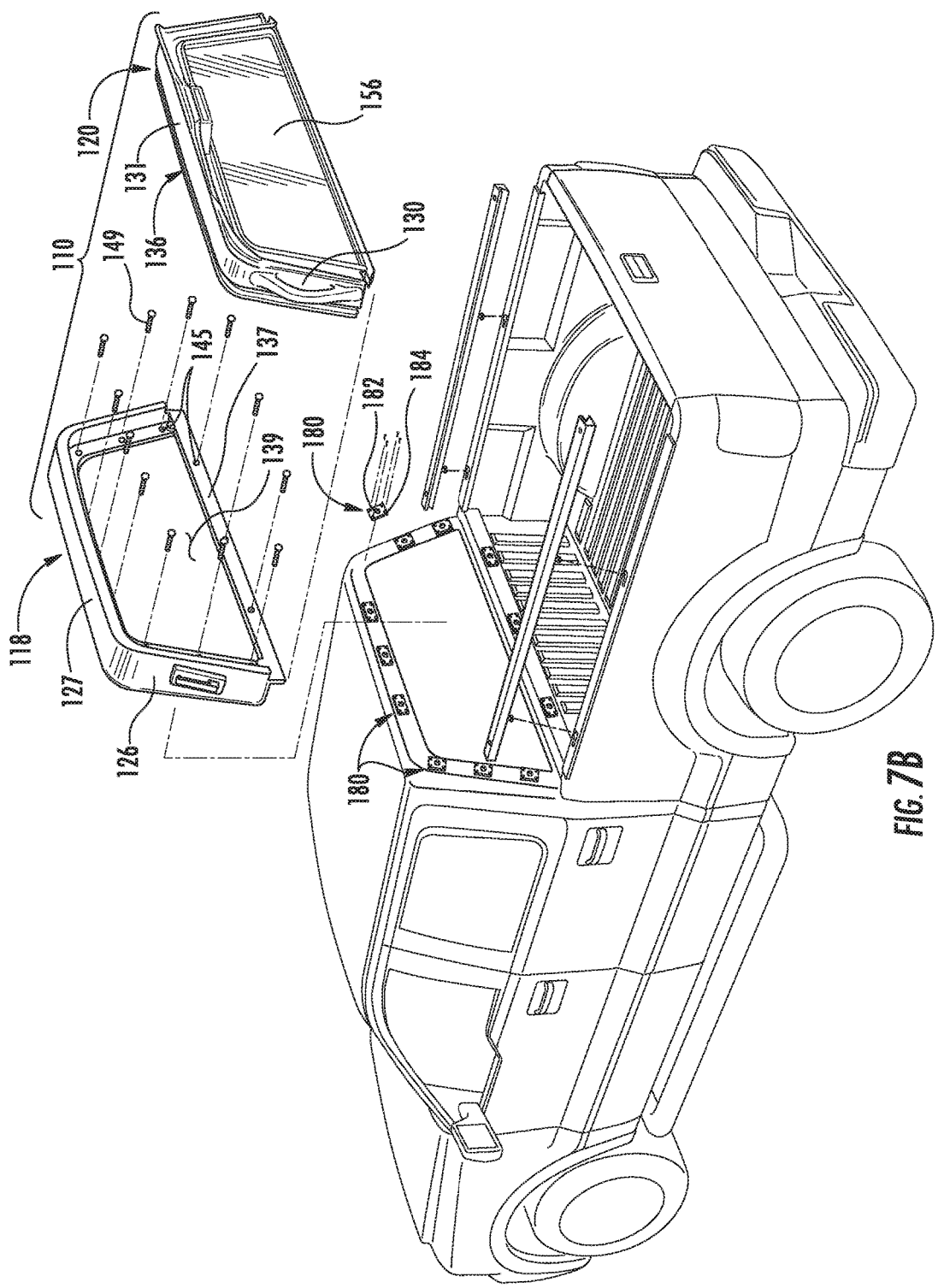
FIG. 7B is an upper perspective, partially exploded view of an alternative mounting system for the truck bed cover depicted in FIG. 7A.
Figure 8:
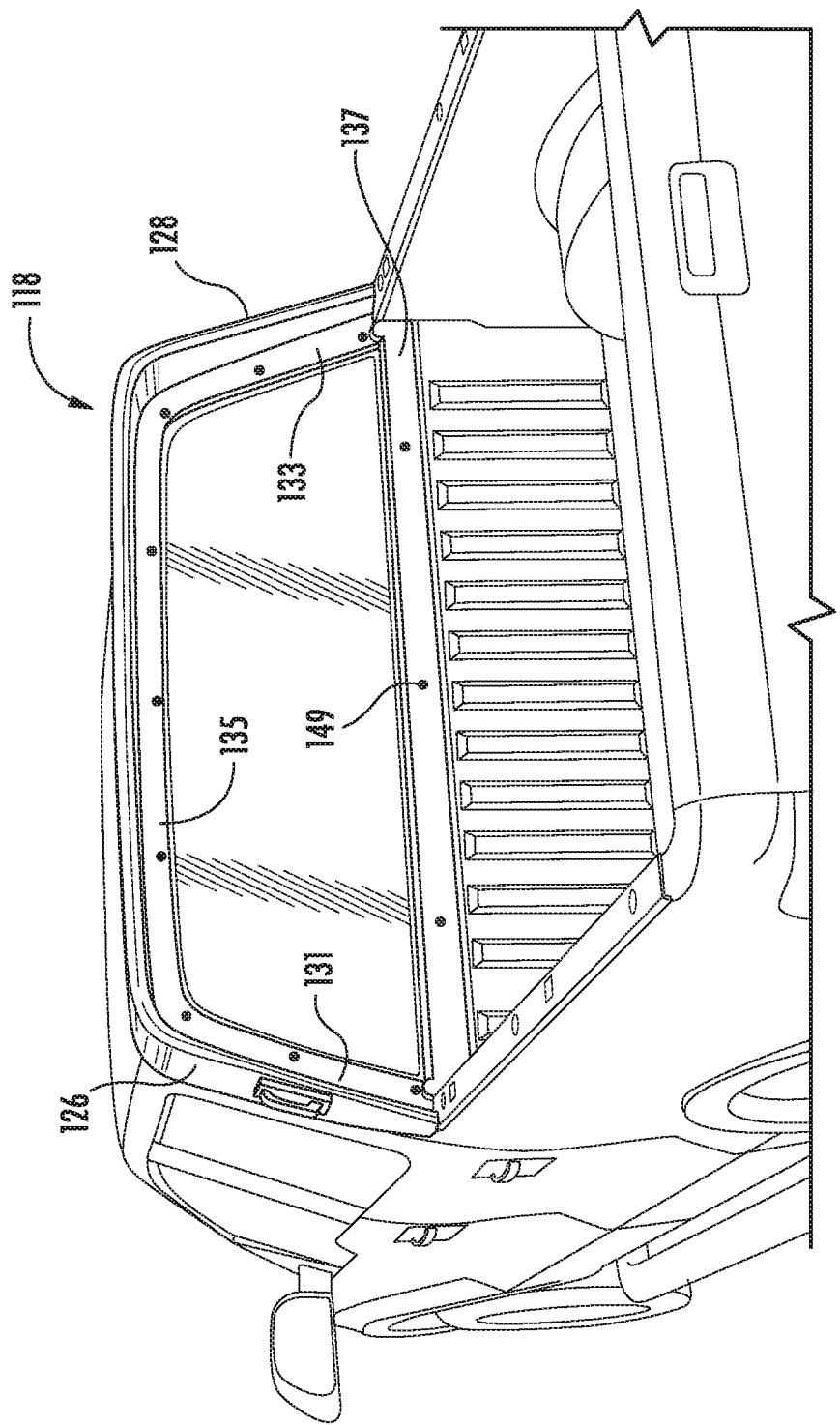
FIG. 8 is an upper perspective view of a first rigid member of the second embodiment of the truck bed cover of attached to the rearward portion of the cab of the truck.
Figure 9:
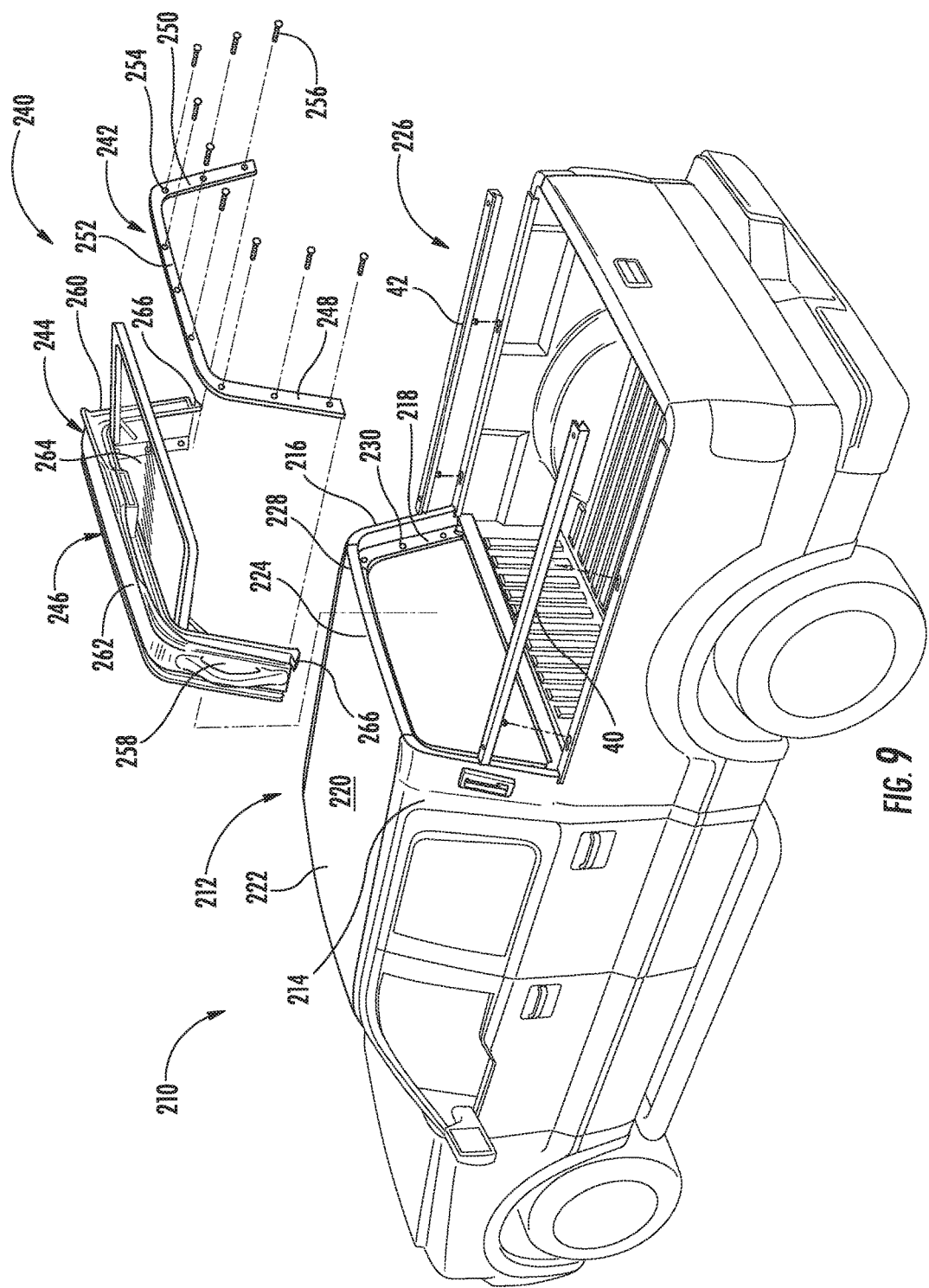
FIG. 9 is an upper perspective, partially exploded view of a third embodiment of a truck bed cover attachable to a cab of a truck.
Figure 10:
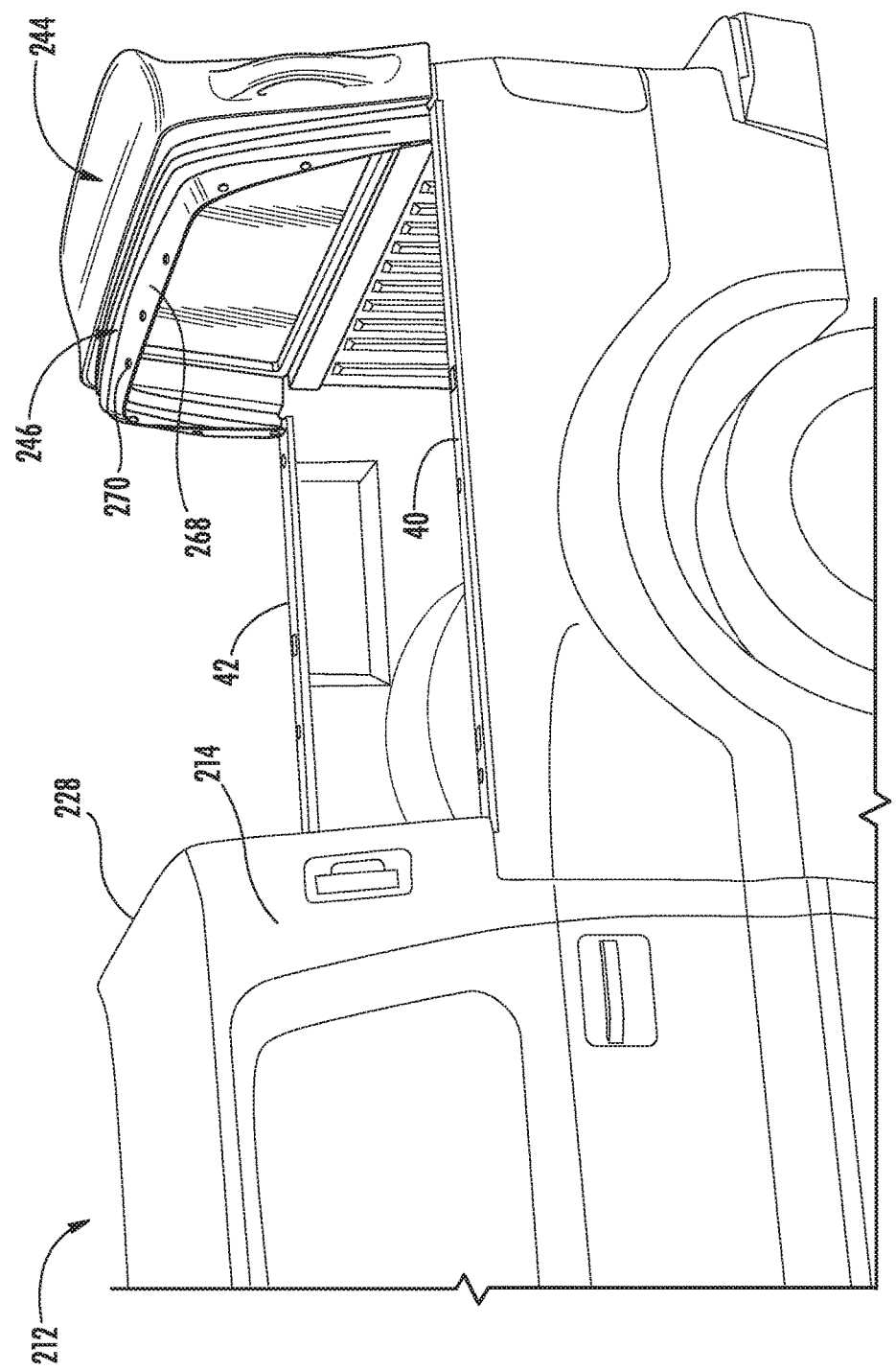
FIG. 10 is an upper perspective view of the third embodiment of the truck bed cover, wherein a shell is detached from the cab for purposes of illustrating an end flap.

Referring now to FIGS. 7A, 7B, and 8, there is depicted a second embodiment of a collapsible truck bed cover 110. FIGS. 9-10 illustrate an integrated first rigid member 118 integrated or integral to the cab 12, whereas FIGS. 7A-8 illustrate the first rigid member 118 as being separate from the cab 12 and attached thereto. The collapsible truck bed cover 110, 240 shown in FIGS. 7A-10 illustrates the shell 136b supported by support structures slidably attached to the rails 40, 42. FIGS. 14-19 illustrate the shell 546 supported by telescoping support structures attached to the cab 212 and the second rigid member 244. The cab shown in FIGS. 14-19 is shown as having the first rigid member being integrated into the cab 12. However, it is also contemplated that the first rigid member may be a separate component and attached to the cab 12 as discussed above in relation to FIGS. 7A-8. The primary distinction between the truck bed cover 110 shown in FIGS. 7A-10 and FIGS. 14-19 relative to the truck bed cover 10 shown in FIGS. 1-6 is that the second embodiment of the truck bed cover 110, 240 is specifically configured and adapted to be secured directly to the truck cab 12 either with an integrated first rigid member 118 shown in FIGS. 9 and 10 or a separate first rigid member 118 shown in FIG. 7A-8. The attachment of the truck bed cover 110, 240 directly to the truck cab 12 and not solely to the truck bed allows the shell 136 to twist and bend as the cab 12 twists and turns with respect to the truck bed 16 as the truck 14 is driven over a roadway that might be uneven. In this manner, forces generated by the cab 12 are not transferred to the truck bed 16 through the shell 136, 246 due to the flexibility of the shell 136, 246. Additionally, the truck bed cover 10 is significantly more secured to the truck 14 compared to a cover 110 that is solely attached to the truck bed and not to the cab 12.

Referring now to FIGS. 7A-8, the truck bed cover 110 includes a first rigid member 118, a second rigid member 120, and a shell 136 extendable between the first and second rigid members 118, 120. As shown in FIG. 7A, the shell 136 is shown in a collapsed configuration and detached from the first rigid member 118 to better illustrate the first rigid member 118. The first rigid member 118 includes a first sidewall 126, a second sidewall 128, and a top wall 127 extending between the first and second sidewalls 126, 128. The outer configuration of the first rigid member 118 generally conforms to the configuration of the cab sidewalls 13, 15, and the cab roof 17. In particular, the distance between the outer surfaces of the first and second sidewalls 126, 128 is substantially the same as the distance between the outer surfaces of the cab sidewalls 13, 15. The first rigid member 118 may include a handle 124 coupled to one or both of the first and second sidewalls 126, 128, with the handle 124 being useful transitioning the second rigid member 120 between the expanded and collapsed positions.

The first rigid member 118 further includes an inner flange 125 having a first side flange segment 131 extending along an inner surface of the first sidewall 126, a second side flange segment 133 extending along an inner surface of the second sidewall 128, and a top flange segment 135 extending along an inner surface of the top wall 127. An optional bottom segment 137 extends between the first and second side flange segments 131, 133 in opposed spaced relation to the top flange segment 135. The flange segments 131, 133, 135, 137 collectively define an opening 139 which is generally complimentary to the configuration of the rear window of the cab 12, with the flange segments 131, 133, 135, 137 completely circumnavigating the opening 139. In embodiments that do not include a bottom segment 137, the flange segments 131, 133, 135 may only partially extend around the opening 139, with the opening 139 being unbounded along the bottom thereof.

The first rigid member 118 includes a forward edge 141 facing toward the cab 12 when the first rigid member 118 is attached thereto, and an opposing rearward edge 143 which faces away from the cab 12 when the first rigid member 118 is attached thereto. According to one embodiment, the inner flange 125 is located between the forward and rearward edges 141, 143 such that rearward portion of the sidewalls 126, 128 and top wall 127 collectively define an overhang segment between the inner flange 125 and the rearward edge 143, which is adapted to at least partially receive the shell 136 when second rigid member 120 is in the collapsed position.

The inner flange 125 includes a first set of apertures 145 formed therein, with the first set of apertures 145 including at least one aperture, and preferably several apertures, along each segment 131, 133, 135, 137 thereof. In the embodiment depicted in FIG. 7A, the cab 12 includes a complimentary second set of apertures 147 predrilled therein along opposed side and top regions of a rearward face of the cab 12, with each aperture 147 being adapted to receive a fastener 149. The first set of apertures 145 and second set of aperture 147 are arranged such that the first and second set of apertures 145, 147 are coaxially aligned with each other when the first rigid member 118 is attached to the cab 12. In particular, a plurality of fasteners 149 may be inserted into respective ones of the first and second aperture 145, 147 to effectuate attachment of the first rigid member 118 to the cab 12. The fasteners 149 may include screws, rivets, bolts, or other fasteners known in the art. The attachment of the first rigid member 118 directly to the cab 12 via the fasteners 149 provides a fixed, rigid interconnection therebetween. In particular, the first rigid member 118 is fixedly securable to the cab 12 at multiple locations, preferably, along the sides and top of the first rigid member 118, and optionally along the bottom of the first rigid member 118. In this respect, the first rigid member 118 and the cab 18 essentially become a single integrated unit, with the first rigid member 118 moving in concert with the cab 18. Thus, even if the truck 14 were to travel over a bump road, the first rigid member 118 moves with the cab 12. Furthermore, the attachment of the first rigid member 118 to multiple locations on the cab 12 distributes the load transfer between the first rigid member 118 and the cab 12, resulting in a more structurally sound attachment. The shell 136 is not a single rigid piece. Rather, the shell 136 can flex and twist so that the twisting and turning of the cab 12 when the truck 14 travels over uneven terrain does not transfer energy from the twisting and turning cab to the second rigid member 120. The shell 136 behaves as a buffer to prevent any forces from the movement of the cab 12 from being disbursed into the truck bed 16 and/or the second rigid member 120.

Referring now to FIG. 7B, there is depicted an alternative for mounting the first rigid member 118 to the cab 12. In particular, FIG. 7B shows a plurality of mounting elements which may be used when the cab 12 does not include predrilled apertures 147.

Each mounting element 180 includes a boss 182 extending from a base plate 184, with the boss 182 defining a boss aperture. The boss 182 is internally threaded and is adapted to threadingly engage externally threaded fasteners. The base plate 184 includes a plurality of apertures formed therein, with the apertures preferably being located at adjacent an outer periphery of the base plate.

Each mounting element 180 is coupled to the cab 12 by securing the base plate 184 to the outer surface of the rear wall of the cab 12 via screws 186, nails, rivets or other mechanical fasteners. The mounting elements 180 are positioned about the cab window, and are spaced in a manner which corresponds to the spacing of the apertures 145 formed on the first rigid member 118. The first rigid member 118 is then secured to the mounting elements 180 by advancing the shafts of fasteners 149 through the apertures 145, and then threadingly engaging the fastener shafts to the boss 182 of a corresponding mounting element 180. Thus, the configuration depicted in FIG. 7B also allows the first rigid member 118 to be fixedly secured to the cab 12, such that the cab 12 and the first rigid member 118 move in concert with each other and essentially form a single, integrated unit. Likewise, the shell 136 can flex and twist so that the twisting and turning of the cab 12 with respect to the truck bed when the trunk 14 travels over uneven terrain does not transfer energy from the twisting and turning cab 12 to the second rigid member 120.

The second rigid member 120 is coupled to the first and second rails 40, 42 and includes a first sidewall 130, a second sidewall 132 and a top wall 134 extending between the first and second sidewalls 130, 132. In this respect, the second rigid member 120 defines a shape that is very similar to the first rigid member 118. A window 156 may be pivotally coupled to the second rigid member 120 and define a shape that is similar to the opening 139 defined by the first rigid member 118. The first and second rigid members 118, 120 are preferably configured and arranged on the truck 14 such that the opening 139 and window 156 are aligned with each other to provide a clear line-of-sight through the cover 110.

The second rigid member 120 is slidably mounted upon rails 40, 42, with the first sidewall 130 being slidably mounted to the first rail 40, and the second sidewall 132 being slidably mounted to the second rail 42. According to one embodiment, each rail 40, 42 includes an elongate groove 48 extending medially along an axial length of the rail 40, 42 and designed to mate with a corresponding laterally extending protrusion 150 extending from respective ones of the first and second sidewalls 130, 132. The groove-protrusion interconnection is similar to the interconnection between the groove 48 and protrusion 50 described in more detail above in relation to the first embodiment. In the prior embodiment, the groove 48 was shown as formed on an inner side of the rails 40, 42. However, the groove 48 may alternatively be formed on an upper side of the rails 40, 42 and be vertically oriented. The protrusion 150 may extend vertically downward and engage the groove 48. The slideable attachment of the second rigid member 120 to the rails 40, 42 enables selective movement of the second rigid member 120 between expanded and collapsed positions, as described in more detail above.

The first and second rigid members 118, 120 are coupled to the shell 136, with the first rigid member 118 being secured to a first end portion of the shell 136 and the second rigid member 120 being secured to a second end portion of the shell 136. The interconnection between the shell 136 and the first and second rigid members 118, 120 may result in a fluid interconnection therebetween. The shell 136 is similar to the shell 36 described above in relation to the first embodiment. In this respect, the shell 136 may be draped over support structures slidably attached to the rails 40, 42, such that the shell 136 is not merely supported by tension between the first and second rigid members 118, 120 and does not sag downward. The shell 136 is supported by the support structures slidably attached to the rails 40, 42. Also, the support structures are not interconnected to each other such that any bending and twisting of the shell 136 caused by the relative movements between the cab 12 and the truck bed 16 does not cause forces from the cab 12 to be transferred to the truck bed 16, and vice versa.

The process of deploying and stowing the cover 110 is similar to the process of deploying and stowing the cover 10 discussed above. In the collapsed position, the shell 136 and plurality of support structures are tucked under the first and/or second rigid members 118, 120. As such, the support structures have a similar configuration compared to the first and second rigid members 118, 120, with the support structures being smaller than the first and second rigid members 118, 120 so that the support structures can be tucked under the first and/or second rigid members 118, 120 when the cover 110 is traversed to the collapsed position. In this regard, a length or segment of the first and/or second rigid members 118, 120 is sufficiently small to tuck the shell 136 and the plurality of support structures thereunder. For instance, the rearwardly extending overhang segment of the may provide a structure which extends over at least a portion of the cover and the support structure(s) when the cover 110 is in the collapsed configuration.

From the collapsed configuration, the second rigid member 120 may slide away from the first rigid member 118 and along the rails 40, 42 toward the tailgate of the truck 14 to deploy the shell 136 over the cab 12 to define an enclosure. Since the first rigid member 118 remains fixedly secured to the cab 18, while the second rigid member 120 is attached to rails 40, 42 of the truck bed, the shell 136 is configured to twist, flex, and bend relative to the cab 12 as the truck bed also twists, flexes and bends relative to the cab 12 during movement of a truck along a road, particularly a bumpy road.

Referring now to FIGS. 9 and 10, there is shown a truck 210 having a cab 212 including a rearward portion configured similar to the first rigid members 18, 118 discussed above. In this respect, certain structural features of the first rigid members 18, 118 are integrated directly into the design of the cab 212 as a unitary structure of the first rigid member 18, 118 and the cab 212.

In particular, the cab 212 includes a first sidewall 214, a second sidewall 216, and a rear wall 218 extending between the first and second sidewalls 214, 216. A roof 220 extends over the cab 212 and includes a forward end portion 222 disposed adjacent the windshield and a rearward end portion 224 disposed adjacent a truck bed 226 and defining a rearward edge 228. The rearward end portion 224 extends beyond the rear wall 218, such that the rearward edge 228 is offset from the rear wall 218 to define an overhang segment, with the rear wall 218 and overhang segment defining a cavity. A first set of apertures 230 is formed in the cab 212 within the rear wall 218 around a periphery of a rear window of the cab 212.

A cover 240 is adapted for use with the truck 210, with the cover 240 generally including an attachment member 242 (e.g., a first rigid member), a second rigid member 244 and a shell 246 extending between the first and second rigid members 242, 244

The attachment member 242 includes a first sidewall 248, a second sidewall 250, and a top wall 252 extending between the first and second sidewalls 248, 250. The configuration of the attachment member 242 generally mirrors the portion of the cab rear wall 218 extending between the rear window of the cab 212 and the sidewalls 214, 216 and the roof 220.

The attachment member 242 includes a second set of apertures 254 formed therein, with the second set of apertures 254 including at least one aperture, and preferably several apertures, along each of the sidewalls 248, 250 and the top wall 252. The second set of apertures 254 are complimentary to the first set of apertures 230 formed in the cab 212. The first set of apertures 230 and second set of apertures 254 are arranged such that the first and second set of apertures 230, 254 are coaxially aligned with each other when the attachment member 242 is attached to the cab 212. A plurality of fasteners 256 may be inserted into respective ones of the first and second apertures 230, 254 to effectuate attachment of the attachment member 242 to the cab 212. In this respect, the attachment member 242 is fixedly secured to the cab 212 via the fasteners 256, such that when the attachment member 242 is secured to the cab, the attachment member 242 and the cab 212 essentially form a single integrated unit, with the attachment member 242 moving in concert with cab 212.

The second rigid member 244 is coupled to the first and second rails 40, 42 and includes a first sidewall 258, a second sidewall 260 and a top wall 262 extending between the first and second sidewalls 258, 260. A window 264 may be pivotally coupled to the second rigid member 244.

The second rigid member 244 is slidably mounted upon rails 40, 42, with the first sidewall 258 being slidably mounted to the first rail 40, and the second sidewall 260 being slidably mounted to the second rail 42. According to one embodiment, each rail 40, 42 includes an elongate groove 48 extending along an axial length of the rail 40, 42 and designed to mate with a corresponding protrusion 266 extending from respective ones of the first and second sidewalls 258, 260. The groove-protrusion interconnection is similar to the interconnection between the groove 48 and protrusion 50 described in more detail above in relation to the first and second embodiments. The slideable attachment of the second rigid member 244 to the rails 40, 42 enables selective movement of the second rigid member 244 between expanded and collapsed positions, as described in more detail above. The groove-protrusion interconnection is shown as being horizontally oriented. However, it is also contemplated that the groove-protrusion interconnection may be vertically oriented. The groove 48 may be formed on the top side of the rails 48, 50 and be oriented vertically. The protrusion 50 may be formed so as to be vertically oriented and slide within the groove 48.

The attachment member 242 and second rigid member 244 are coupled to the shell 246, with the attachment member 242 being secured to a first end portion of the shell 246 and the second rigid member 244 being secured to a second end portion of the shell 246. Referring now to FIG. 10, the first end portion of the shell 246 includes an end flap 268 which includes a third set of apertures 270 formed therein. The third set of apertures 270 is configured and arranged similar to the first and second sets of apertures 230, 254 formed in the cab 212 and attachment member 242, respectively.

When the cover 240 is attached to the truck 210, the end flap 268 is captured between the attachment member 242 and the rear wall 218 of the cab 212. In particular, the third set of apertures 270 is aligned with the first set of apertures 230 formed in the cab 212 and the second set of apertures 254 formed in the attachment member 242 and the fasteners 256 are advanced through the apertures 230, 254, 270 to secure the shell 246 and attachment member 242 to the cab 212.

The shell 246 extends between the cab 212 and the second rigid member 244 and may be draped over support structures slidably attached to the rails 40, 42, such that the shell 246 is not merely supported by tension between the cab 212 and the second rigid member 244 and does not sag downward. The attachment of the end flap 268 directly to the cab 212 and the second end portion to the second rigid member 244, which is secured to the truck bed allows the shell 246 to twist, bend, and flex relative to the cab as the truck bed twists, bends, and flexes relative to the cab 212 as the truck travels over a road, particularly a bumpy road.

The cover 240 is selectively deployable or transitional between a collapsed configuration and an extended configuration. In the collapsed configuration, at the second rigid member 246 is positioned adjacent the rear wall 218 of the cab 212, with the shell 246 and support structures being located under the overhang segment of the cab 212. The second rigid member 246 is slidable from the collapsed configuration toward the extended configuration by moving the second rigid member 246 away from the cab 212 and toward the tailgate of the truck. This movement extends the shell 246 over the cab 226 to define an enclosure.

Figure 11:
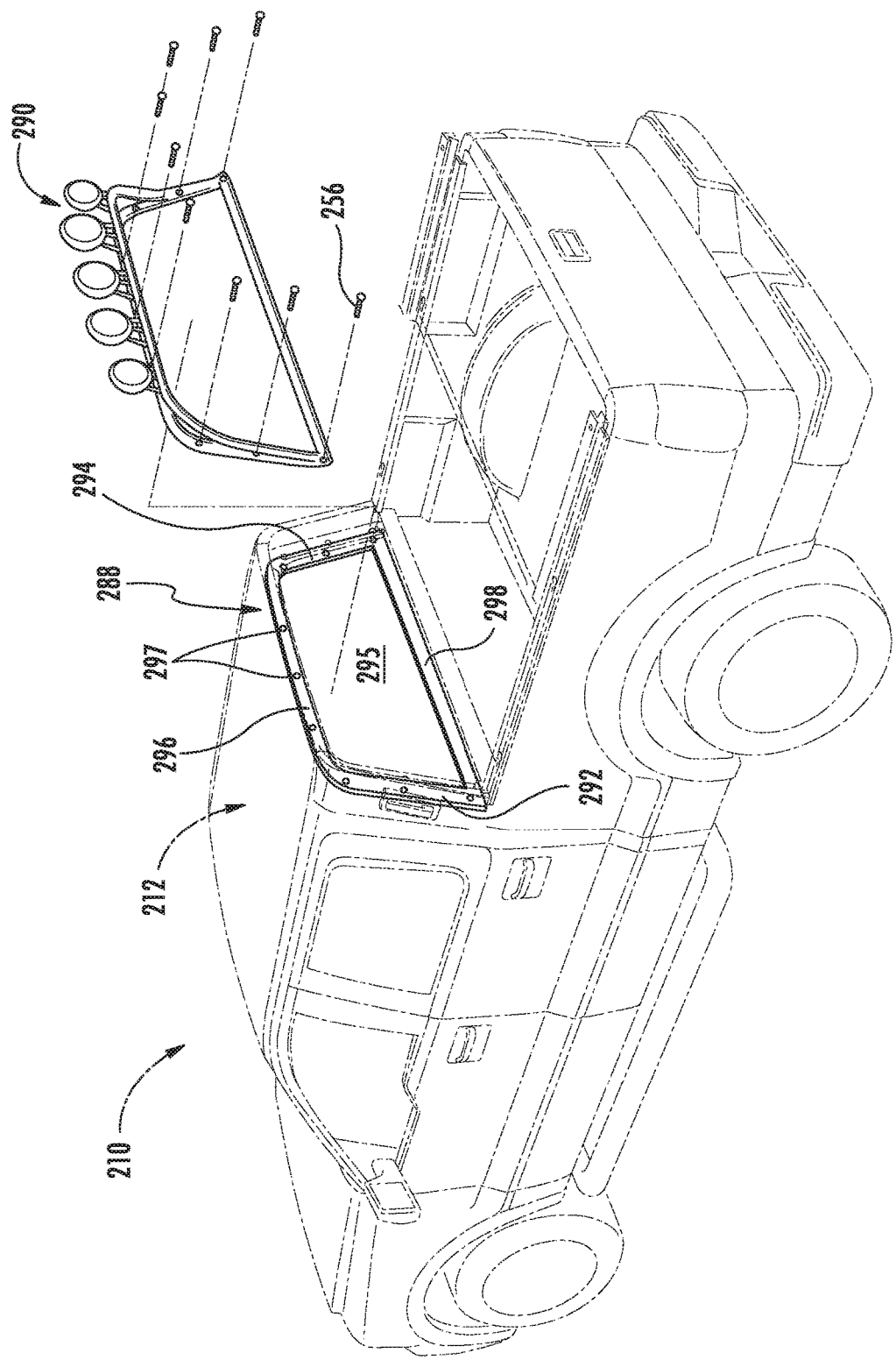
FIG. 11 is an upper perspective view of an internal reinforcement member positioned adjacent a rear wall of a cab, the truck being shown in phantom.

Referring now to FIG. 11, there is depicted an internal reinforcement member 288 disposed within the cab 212 to provide support for items attached to the cab 212, such as the truck bed cover, or other accessories, such as a light bar 290, bike rack, tool box, or any other accessory/item which may be disposed in a truck bed and secured or held in place within the truck bed. The internal reinforcement member 288 may be attached to, or may be part of, the chassis or frame of the vehicle. The internal reinforcement member 288 may define a configuration that is similar to the attachment member 242 discussed above. In this respect, the reinforcement member 288 may include a first sidewall 292, a second sidewall 294, and a top wall 296 extending between the first and second sidewalls 292, 294. A bottom wall 298 may extend between the first and second sidewalls 292, 294 in opposed relation to the top wall 296. In this respect, the bottom wall 298 may extend generally parallel to the top wall 296. In contrast, the first and second sidewalls 292, 294 may be disposed in a generally non-parallel arrangement, with the first and second sidewalls 292, 294 being closer together adjacent the top wall 296 than the bottom wall 298. The configuration of the internal reinforcement member 288 depicted in FIG. 11 circumnavigates the cab window 295, with the inner periphery of the internal reinforcement member 288 generally conforming to the outer periphery of the window 295.

The internal reinforcement member 288 includes a set of apertures 297 formed therein, including at least one aperture, and preferably several apertures, along each of the sidewalls 292, 294 and the top wall 296. Although the bottom wall 298 depicted in FIG. 12 does not include apertures, those skilled in the art will readily appreciate that one or more apertures may also be formed in the bottom wall 298. The set of apertures 297 formed in the reinforcement member 288 are complimentary to, and aligned with, apertures formed in the cab 212 to allow advancement of a fastener 256 through both the cab aperture and reinforcement aperture 297 when attaching the accessory 290 to the cab 212.

When an accessory 290 is attached to the internal reinforcement member 288, the weight of the accessory 290, and any forces associated therewith, are transferred to the internal reinforcement member, rather than such weight or forces being supported merely by the wall of the cab 212.

Figure 12:
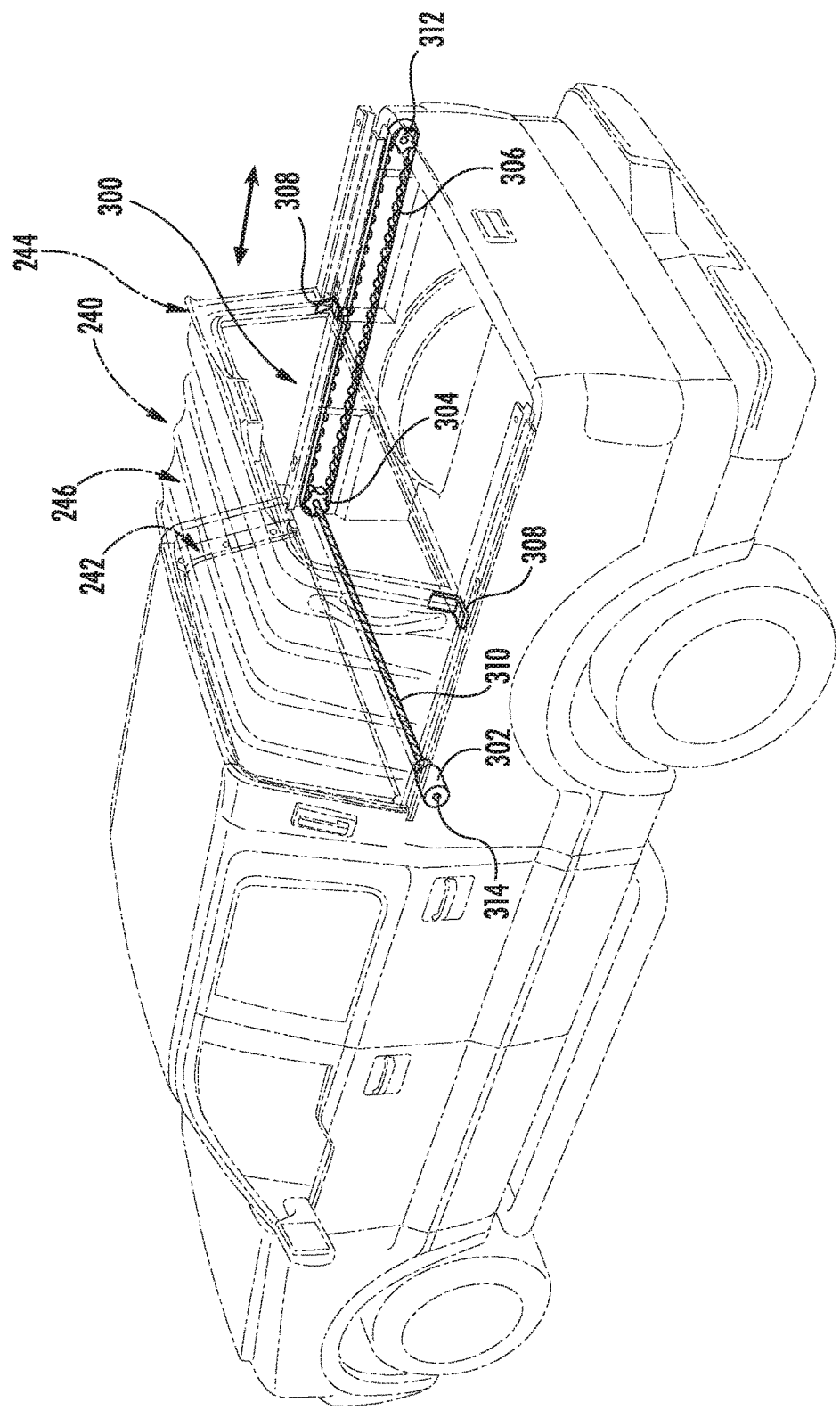
FIG. 12 is an upper perspective view of an automation system adapted to effectuate automated transition of the truck bed cover between expanded and collapsed positions.

Referring now to FIG. 12 there is depicted an automation system 300 specifically adapted for automating the movement of the truck bed cover 240 between its expanded and collapsed positions. More specifically, the automation system 300 enables selective movement of the second rigid member 244 relative to the attachment member 242 and/or the truck bed 16 completely between the expanded and collapsed positions, as well as partially between the expanded and collapsed positions. In this regard, the degree by which the second rigid member 244 is moved relative to the attachment member 242 may be selectively controlled by the user.

According to one embodiment, the automation system 300 generally includes a motor 302, a drive gear 304, a belt 306, and a pair of slide members 308. The motor 302 may be any suitable mechanism known in the art having suitable power for selectively moving the second rigid member. The motor 302 is coupled to the drive gear 304 via an intervening axle 310, wherein the motor 302 rotates the axle 310, which in turn rotates the drive gear 304. The motor 302 is capable of rotating the axle 310 in opposing first and second rotational directions, wherein rotation of the axle 310 in the first rotational direction results in movement of the second rigid member 244 toward the expanded position, and rotation of the axle 310 in the second rotational direction results in movement of the second rigid member 244 toward the collapsed position.

The drive gear 304 may include a plurality of gear teeth which are designed to mesh with the belt 306 for driving the belt 306. In the exemplary embodiment, the belt 306 includes a plurality of ribs which are complimentary to the gear teeth, wherein the gear teeth and belt ribs are specifically configured and adapted such that the gear teeth may be received between adjacent belt ribs when the gear tooth is meshed with the belt 306. Other types of belts, e.g., chain drive belt, known in the art may also be used without departing from the spirit and scope of the present disclosure. Moreover, it is also contemplated that the drive mechanism may be a chain in lieu of a belt and a mating drive gear and sprocket. Alternative, the second rigid member may be traversed between the expanded and collapsed positions with a screw drive driven by the motor 302.

The belt 306 is routed around the drive gear 304 on one end and a pulley 312 on the other end, wherein the pulley 312 is specifically configured and adapted to mesh with the belt 306. Although the exemplary embodiment shows the drive gear 304 and motor 302 located adjacent the cab and the pulley 312 located by the tailgate, it is understood that other embodiments may include the motor 302, drive gear 304, and pulley 312 positioned at other locations. For instance, the pulley 312 may be located near the cab, and the motor 302 and drive gear 304 may be located adjacent the tailgate.

The slide members 308 are coupled to the second rigid member 244, with at least one slide member 308 being coupled to the belt 306 to couple the second rigid member 244 to the belt 306. As such, movement of the belt 306 creates movement of the second rigid member 244 by virtue of the interconnection therebetween via the slide member 308. The slide members 308 are coupled to respective side portions of the second rigid member 244 via any mechanical fastener known in the art, including but not limited to, rivets, screws, nails, bolts, adhesives, etc. The slide members 308 are also translatable relative to the sidewalls of the truck bed. According to one embodiment, the slide members 308 may include a tongue or post which slides within a groove or track formed in the sidewall or the rails 40, 42 attached to the sidewalls. As an alternative, the slide member 308 may extend around the top of the sidewall between the belt 306 and the second rigid member to enable translation of the slide member 308 relative to the sidewall.

The system 300 may include a control mechanism, such as a lever, button(s), switch, etc., for selectively actuating the motor 302 to move the second rigid member 244. The control mechanism may be integrated into the driver control in the cab of the truck or located within the 240. The system may be configured to allow a user to initiate movement of the second rigid member 244 and cease movement of the second rigid member 244 at any location between the expanded and collapsed positions. For instance, a user may push a lever in a first direction to move the second rigid member 244 toward the expanded position, such that when the user releases the lever, the movement of the second rigid member 244 stops. Likewise, the user may push the lever in a second direction to move the second rigid member 244 toward the collapsed position, with the release of the lever causing a stoppage in movement of the second rigid member 244. Furthermore, the control mechanism may be configured to automatically stop operation of the motor 302 when the second rigid member 244 arrives at the expanded position or the collapsed position.

Although the foregoing describes the system 300 as being operated by the motor 302, it is also contemplated that in other embodiments, the system 300 is operated manually. For instance, the belt 306 may be driven by a manually operated crank or cable. Furthermore, although the system 300 is shown as being used in connection with the embodiment of the truck bed cover 240, it is also contemplated that the system 300 may also be used in connection with truck bed covers 10, 110.

Figure 13:
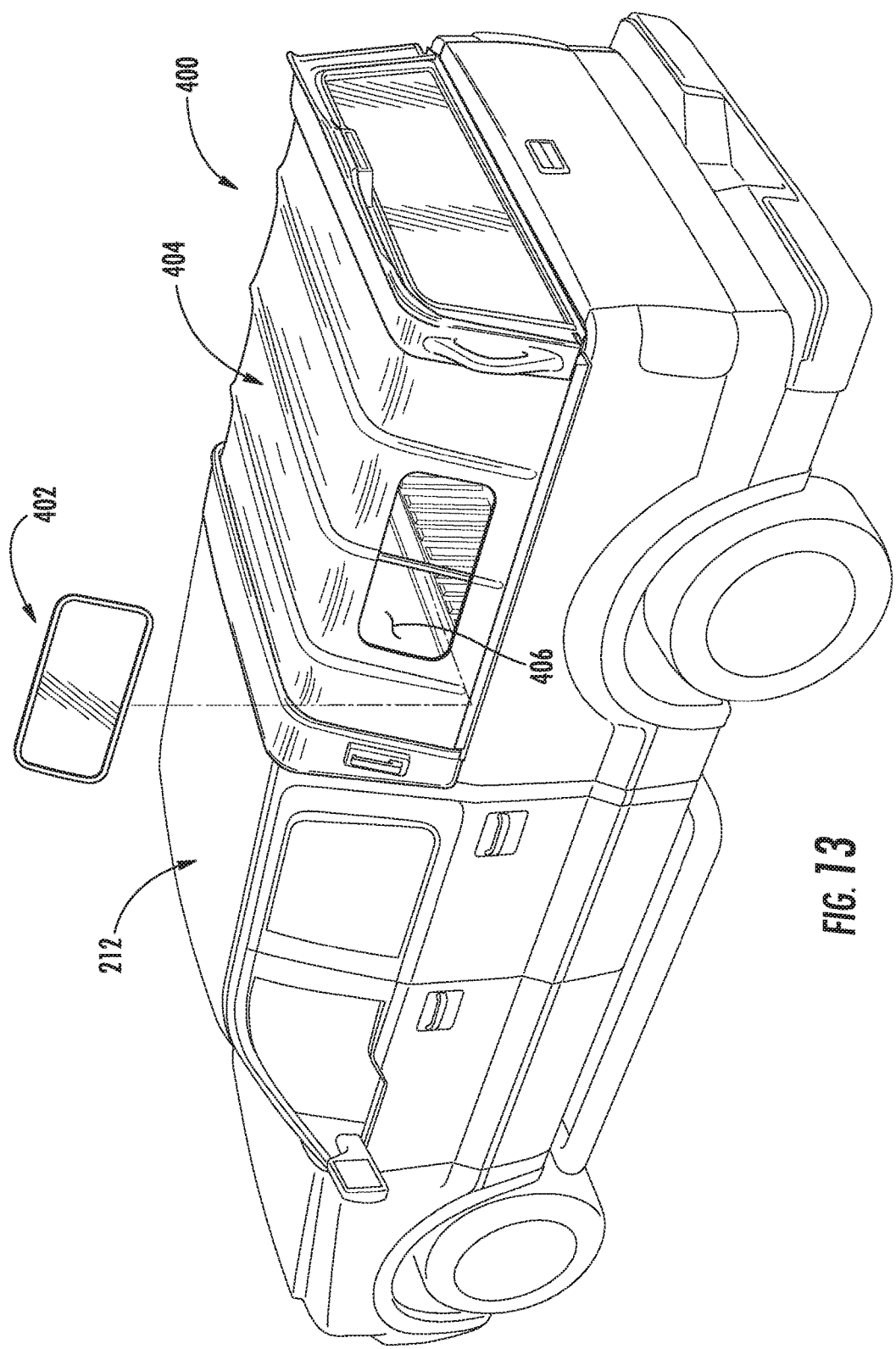
FIG. 13 is an upper perspective view of an embodiment of a truck bed cover having a detachable window integrated into a shell.
Figure 14:
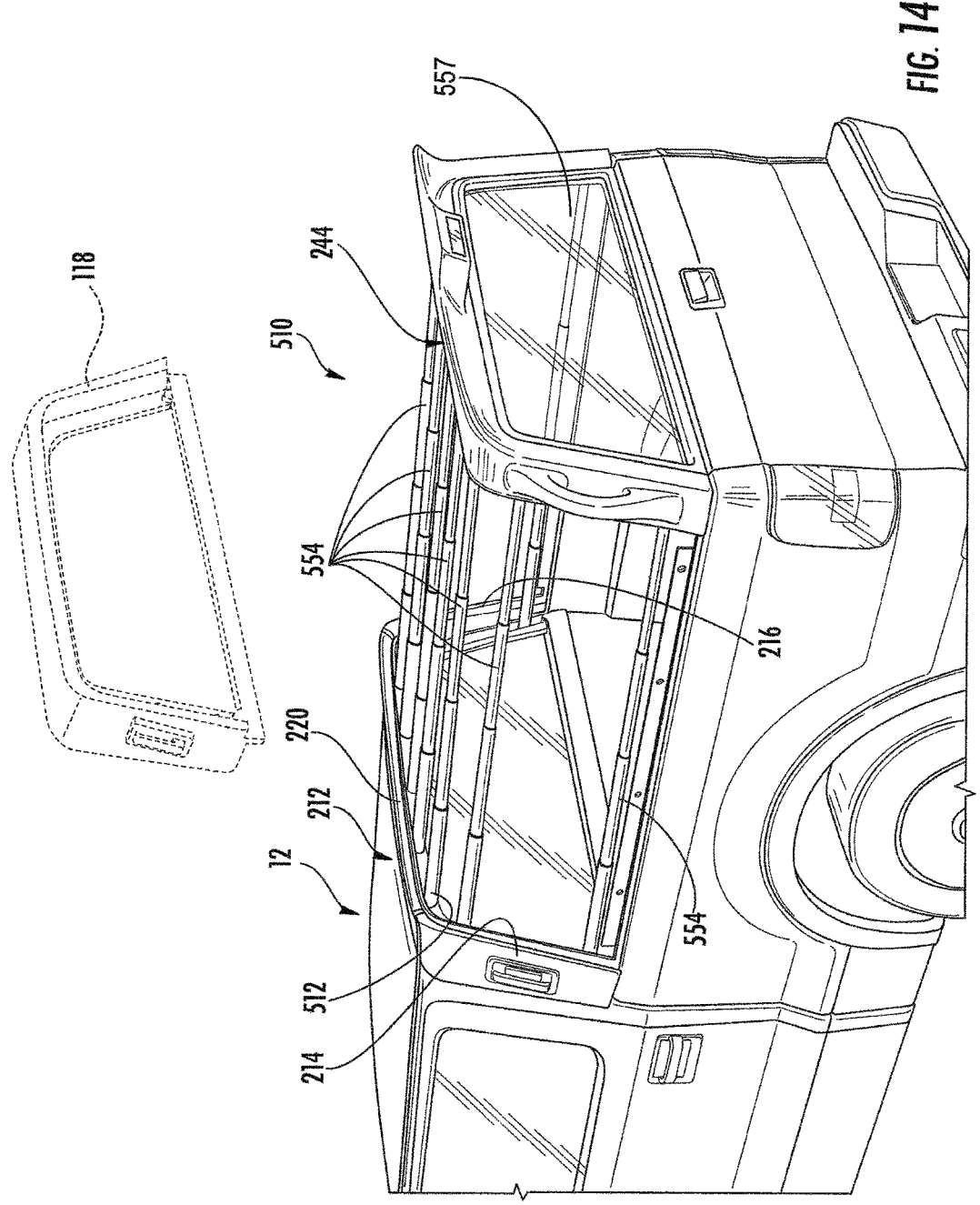
FIG. 14 is a perspective view of a cab mounted truck bed cover.

Referring now to FIG. 13, there is depicted another embodiment of the cover 400 which includes a window 402 incorporated into the shell 404. The window 402 is preferably fabricated from a flexible, transparent material, such as plastic or other materials known by those skilled in the art. The flexible nature of the window 402 allows the window 402 to be folded or collapsed when the cover 400 is placed in the collapsed position. The window 402 may also assume a generally unfolded, or substantially planar configuration when the cover is transitioned to the extended position. The window 402 may be attached to the shell 404 via a zipper, hooks and loops fasteners, snaps, buttons, or other mechanical fasteners known in the art. According to one embodiment, when the window 402 is attached to the shell 404, the window 402 forms a substantially fluid-tight seal with the shell 404 to mitigate entry of rain or other precipitation through the interface of the window 402 and the shell 404. To accommodate the window 402, the shell 404 includes an opening 406 having a shape which generally corresponds to the shape of the window 402. The size of the opening 406 and the window 402 may be such that the window 402 substantially covers the opening 406 when the window 402 is attached to the shell 404. The window 402 may be detached from the shell 404 to access the truck bed or to provide ventilation/air circulation to the truck bed. The window depicted in FIG. 14 is formed along a sidewall of the shell 404 at an approximate midpoint, e.g., between the cab 212 and the tailgate 215 when the shell 404 is in the expanded position, although it is understood that the placement of the window 402 is not limited thereto. In this respect, the window 402 may be located anywhere on the shell 404. Furthermore, any number of windows 402 may be incorporated into the shell 404.

Referring now to FIGS. 14-19, another embodiment of the truck bed cover 510 is illustrated. The truck bed cover 510 incorporates the cab 212 shown in FIGS. 9 and 10 which integrates the first rigid member 118 into the cab 12 to form the cab 212. Alternatively, the first rigid member 118 may be separate component as shown in hidden lines in FIG. 14. In this regard, the first rigid member may be attached to the cab and is not integrated into the cab. Additionally, the truck bed cover 510 incorporates the second rigid member 244 discussed in relation to FIGS. 9 and 10. The truck bed cover 510 is different from the truck bed cover 240 in that the shell 546 (see FIG. 16) is supported by a plurality of horizontally telescoping support structures 554 that are attached to the cab 212 and the second rigid member 244, whereas, the shell 246, 136 shown in FIGS. 7A-10 is supported by support structures 54 that are slidably attached to the rails 40, 42.

Referring now more particularly to FIG. 14, the truck incorporates the cab 212 discussed in relation to FIGS. 9 and 10 in that the rearward portion of the cab 212 is configured similar to the first rigid members 18, 118 discussed above. Certain structural features of the first rigid members 18, 118 are integrated directly into the design of the cab 212 as a unitary structure of the first rigid member 18, 118 and the cab 212, as discussed above. The cab 212 may include a plurality of mounting brackets 512. The mounting brackets 512 may be positioned about an inner perimeter of the roof 220, first and second side walls 214, 216. The mounting brackets 512 may be permanently or removably securable to first ends of the telescoping support structures 554. Additionally, the attachment between the mounting brackets 512 and the first ends of the telescoping support structures 554 may allow for pivoting of these telescoping support structures 554 to the mounting brackets 512 so that as the truck moves over uneven terrain and the body of the truck twists and turns, the second rigid member 244 moves with the bed of the truck and not with the cab 212. This allows the shell 546 to move independent of the cab so that the twisting and turning of the cab 212 when the truck travels over uneven terrain does not transfer all of the energy from the twisting and turning cab 212 to the second rigid member 244.

The pivotal connection between the telescoping support structures 554 and the mounting brackets 512 may allow for multi-axes pivoting. The pivotal connection may be accomplished with a ball joint, universal joint and the like. The telescoping support structures 554 may be traversed between an extended position shown in FIG. 14 and a collapsed position shown in FIG. 20. In the extended position, the telescoping support structures 554 extend from the mounting brackets 512 to the second rigid member 244. In the collapsed position the length of the telescoping support structures 554 collapses within each other and allows the second rigid member 244 to lock against the cab 212 (see FIG. 20). The telescoping support structures 554 may also define second ends which are pivotally connected to the second rigid member 244. In the same manner, the pivotal connection between the telescoping support structures 554 and the second rigid member 244 may allow for multi-axes pivoting and be accomplished with a ball joint, universal joint and the like.

Figure 21:
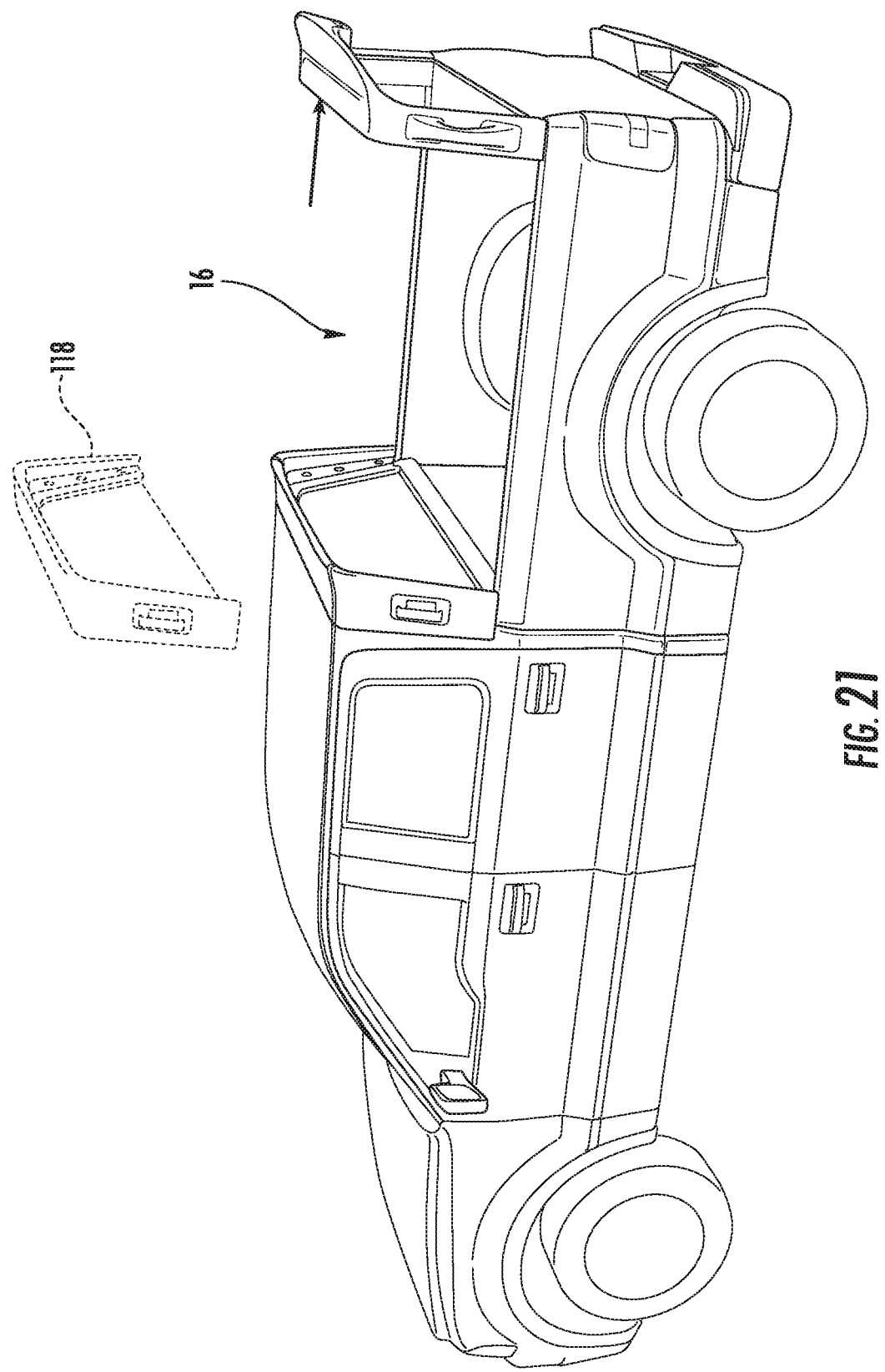
FIG. 21 illustrates the second rigid member being traversed to a back end of the truck bed adjacent to the tailgate.
Figure 22:
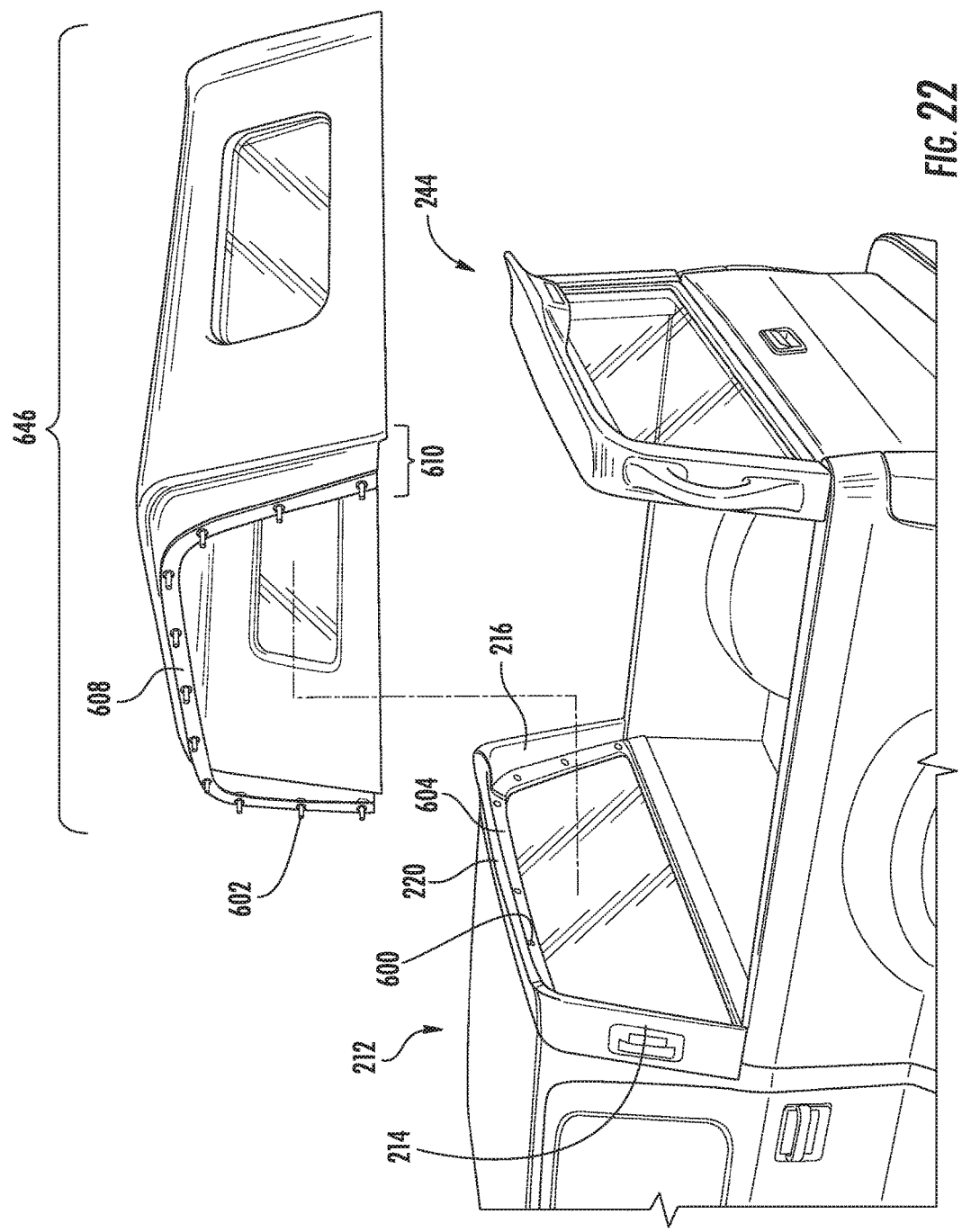
FIG. 22 illustrates a rigid shell attachable to the cab and the second rigid member.

The telescoping support structures 554 may be straight and extend or contract solely in the longitudinal direction. The telescoping support structures 554 may be oriented horizontally generally parallel to the truck bed. The telescoping support structures 554 may also be substituted with non-telescoping support structures 556. The non-telescoping support structures 556 may be attached to the cab 212 to the mounting brackets 512 and the second rigid member 244 when the second rigid member 244 is traversed toward the tailgate as shown in FIG. 21. The non-telescoping support structures 556 may be pivotally attached to the mounting brackets 512 positioned on the cab 212 and the second rigid member 244 in the same fashion as the telescoping support structures 554.

Figure 20:
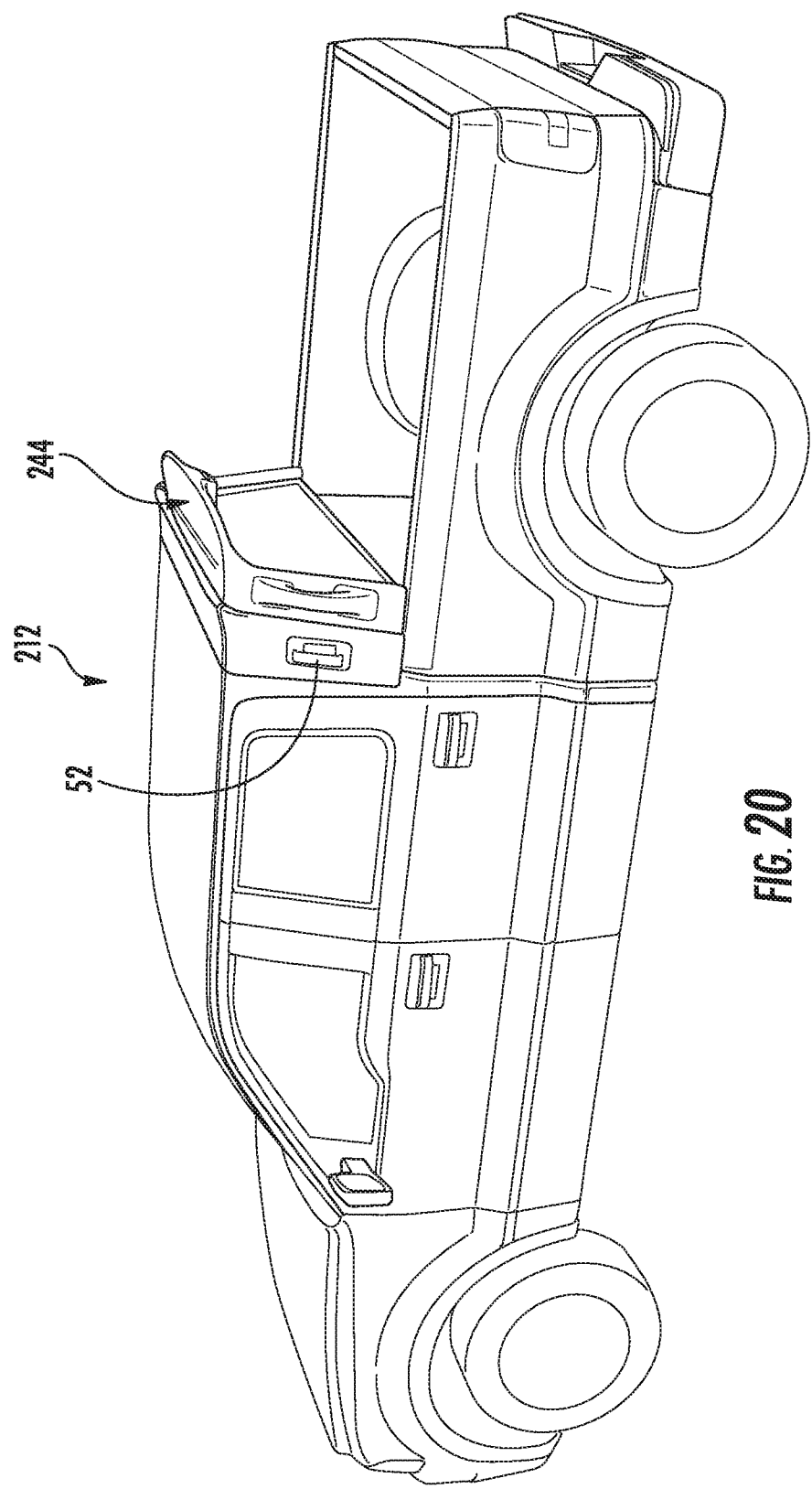
FIG. 20 illustrates another embodiment of the cab mounted truck bed cover with the second rigid member positioned closer to the cab than a tailgate.

The cover 510 also incorporates rails 40, 42 on the first and second side walls of the truck bed that allow the second rigid member 244 to slidably traverse to the position shown in FIG. 14 as well as slidably be traversed to the cab 212 when collapsing the truck bed cover 510, as shown in FIG. 20.

Figure 15:
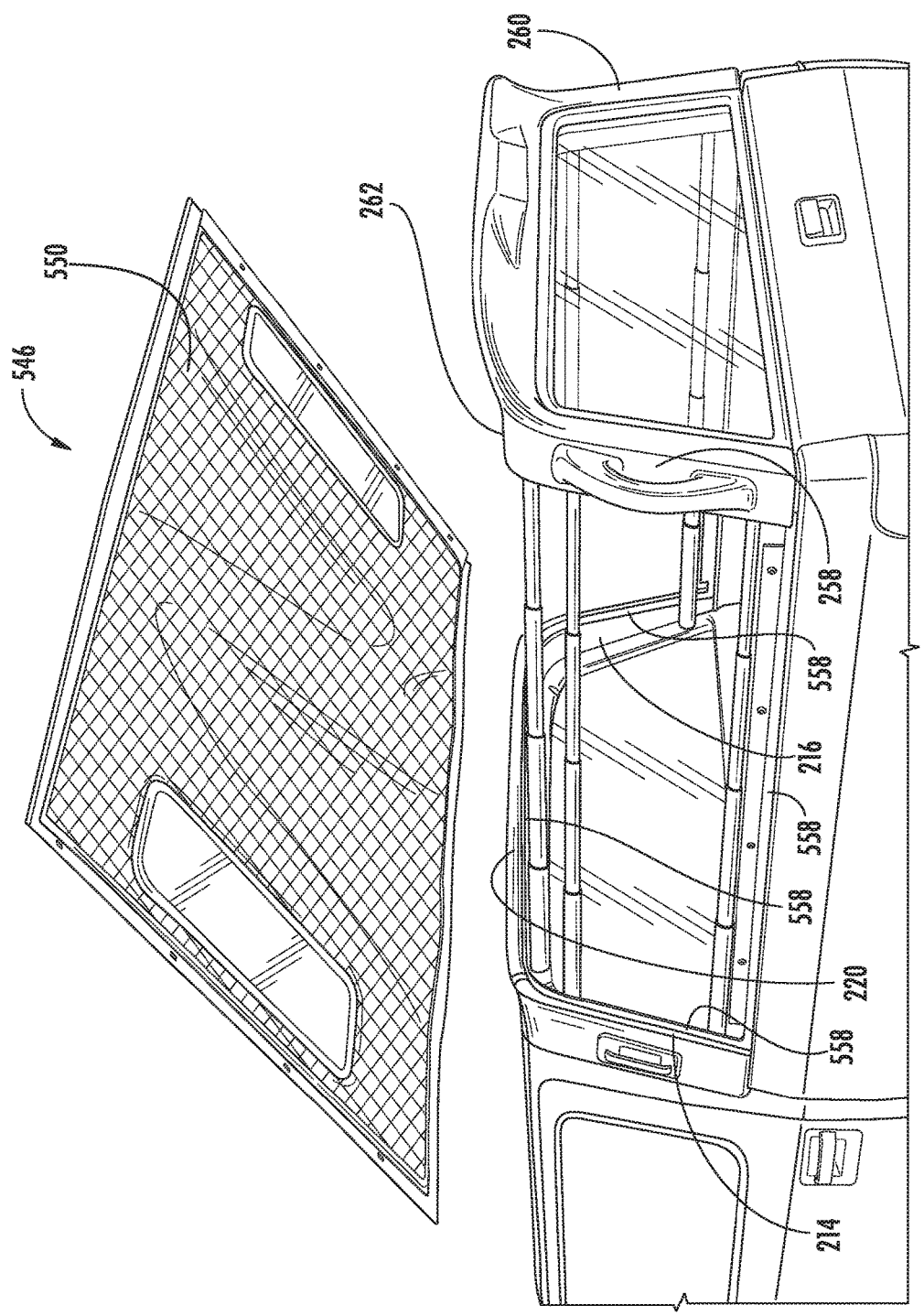
FIG. 15 is a perspective view of the cab mounted truck bed cover with a shell disposed above a plurality of telescoping support structures.

Referring now to FIG. 15, the shell 546 is shown. The shell 546 may have an outer layer that may preferably be watering impermeable, but also contemplated to be non-water impermeable. The outer layer may be attached to an elastic netting 550. The elastic netting 550 may be disposed on the bottom side of the outer layer 548. The elastic netting 550 may define an outer periphery which is attached to the outer periphery of the outer layer 548. Preferably, the outer periphery of the elastic netting 550 is smaller than the outer periphery of the outer layer 548 so that when the shell 546 is attached to the truck bed cover 510, the elastic netting 550 may cause the shell 546 to be taut and pressed against the support structures 554, 556. The elastic netting 550 may be selectively secured to the outer layer 548 at various points interior to the outer periphery of the outer layer 548.

The outer perimeter of the shell 546 may have a first half of a zipper 558. The interior side of the first side wall 214, second side wall 216 and the roof 220 may have a second half of the zipper 558. The second half of the zipper 558 may extend beyond the perimeter of the first and second side walls 214, 216 and the roof 220. Alternatively, the second half of the zipper 558 may be tucked under the first and second side walls 214, 216 and the roof 220 so that rainwater does not seep through the zipper 558. Moreover, the first and second halves of the zipper 558 may have a water resistant covering to further mitigate passage of rainwater through the zipper 558. Additionally, the second half of the zipper 558 may also be lined against a length of the first and second side walls of the truck bed. The second half of the zipper 558 may be secured to the rails 40, 42, and more particularly be disposed on an outer side of the rails 40, 42 to allow rainwater to cascade away from the interior of the truck bed and onto the exterior side of the first and second side walls of the truck bed. The second rigid member 228 may also have a second half of the zipper 558 attached to the frontal perimeter of the second rigid member 228. The second half of the zipper 558 attached to the second rigid member 228 may be tucked under the left and right side walls 258, 260 and the roof 262.

Figure 16:
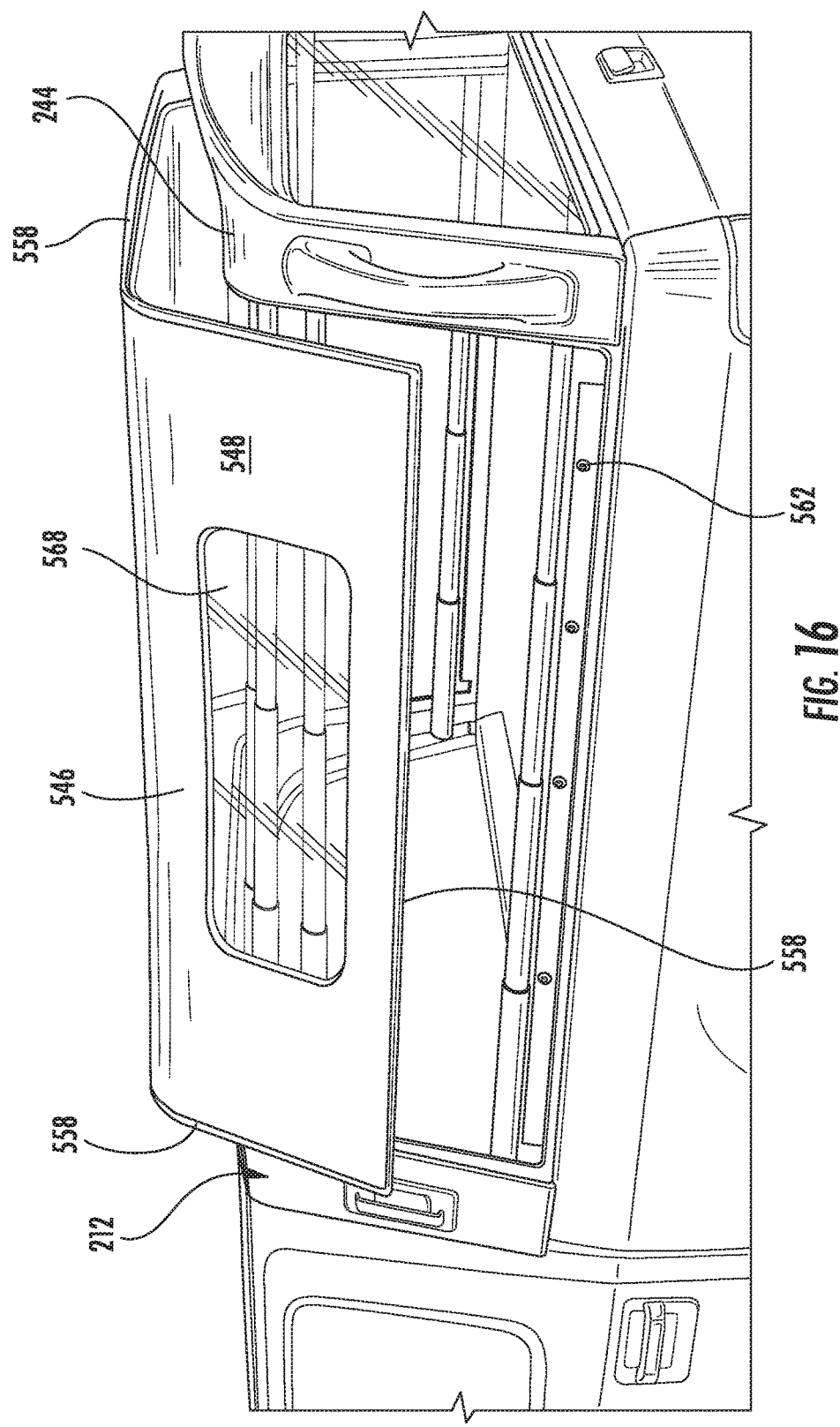
FIG. 16 is a perspective view of the cab mounted truck bed cover and the shell with the shell being positioned over the telescoping support structures.
Figure 17:
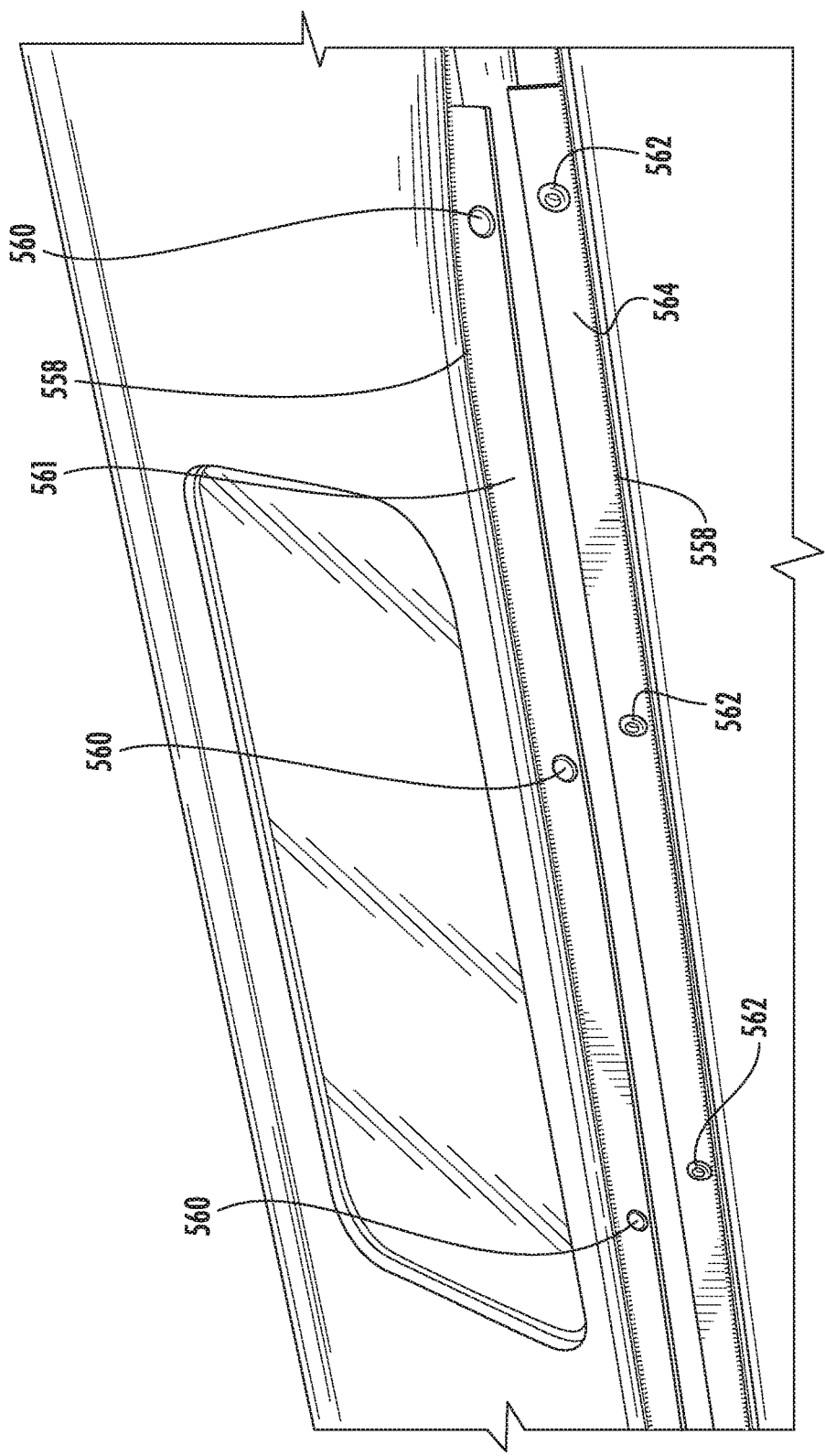
FIG. 17 illustrates snaps of the shell being attached to snaps attached to the truck bed.
Figure 18:
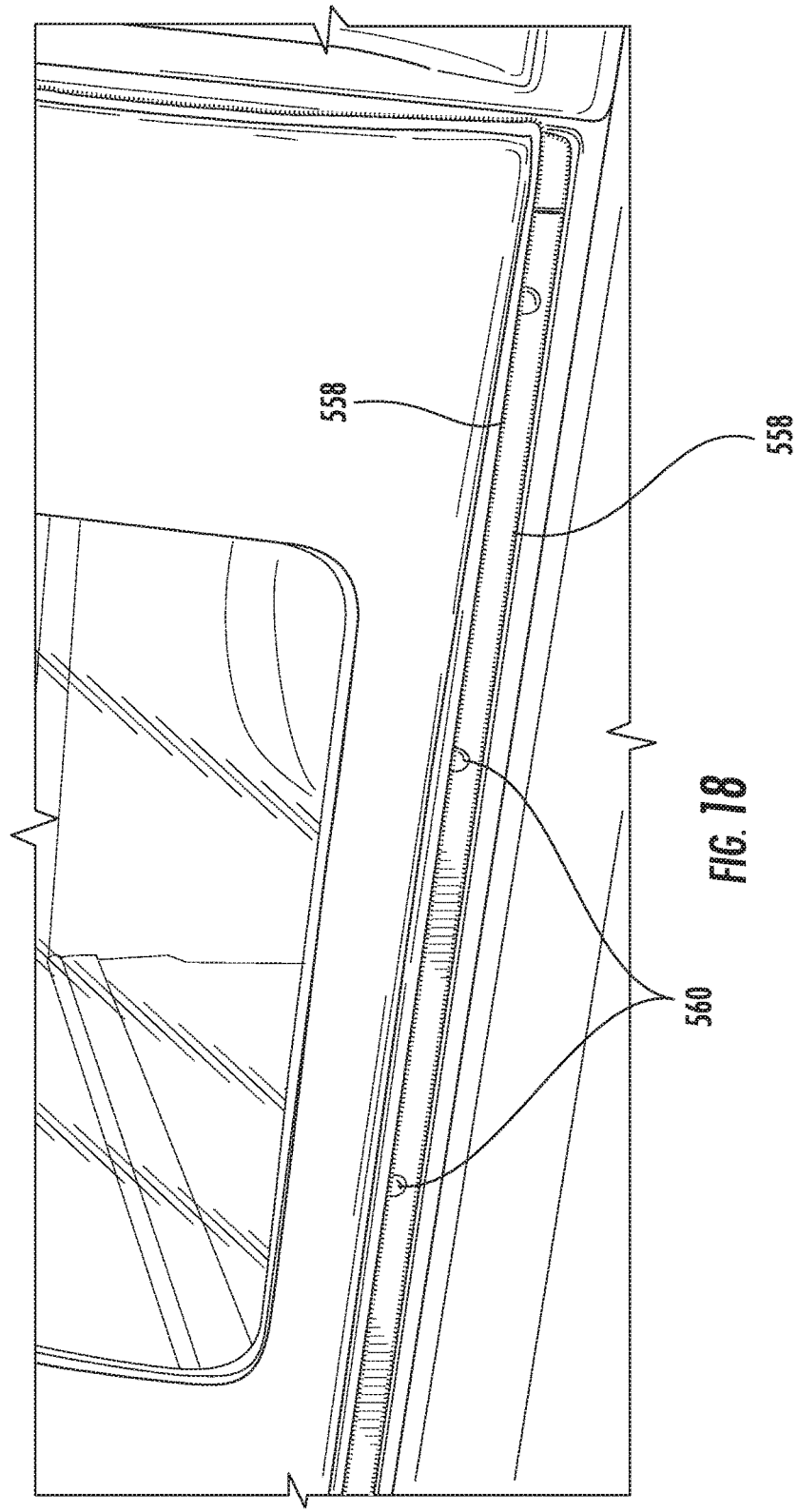
FIG. 18 illustrates the snaps of the shell connected to the snaps attached to the truck bed.
Figure 19:
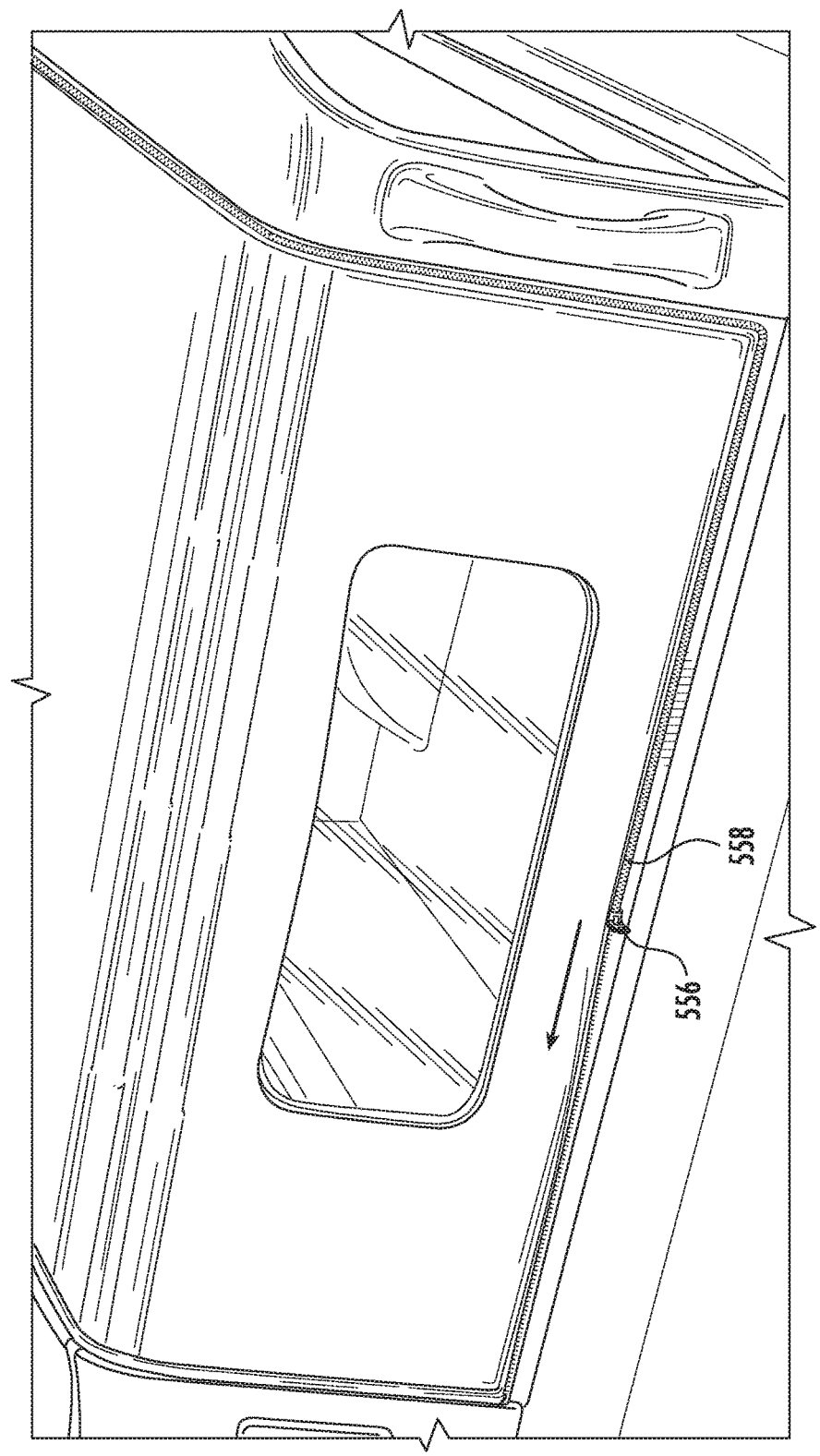
FIG. 19 illustrates a first half of a zipper attached to the shell being engaged a second half of the zipper attached to a cab, sidewalls of the truck bed and a second rigid member.

Referring now to FIG. 16, the shell 546 may be aligned to the first and second side walls 214, 216 and roof 220 of the cab 212 and the second rigid member 244 shown in FIG. 16. To attach the shell 546 to the cab 212, second rigid member 244, the shell 546 may have a plurality of snaps 516 along an edge that is connected to the first and second side walls 214, 216 of the truck bed. The snaps 516 may be secured to a hem 561 that extends under the outer layer 548. The snaps 516 may be secured to the corresponding snaps 562 that are disposed interior to the zippers 558. The snaps 560, 562 are secured to each other first on both sides (i.e., passenger and driver sides) of the shell 546. The elastic netting 550 draws the outer layer 548 tight against the supporting structures 554, 556 when the snaps 560, 562 are engaged to each other on both sides at the first and second side walls of the truck bed. The hem 561 is layered over the hem 564 so that water that falls on the outer layer 548 cascades down the side of the side walls 214, 216. Moreover, the zippers 558 are attached over the overlapping hems 561, 564 to further prevent or mitigate water from entering the truck bed area. Referring now to FIG. 18, the snaps 560, 562 are engaged to each other. Referring now to FIG. 19, first and second halves of the zipper 558 are secured to each other by the slider 566.

The shell 546 may have a window 568 on one or both sides. Moreover, the outer layer 548 of the shell 646 is or may be fabricated from a flexible material. In a variant of the shell 546, the shell 546 may be a rigid member that is shaped, sized and configured to fit between the cab 212 and the second rigid member 244 as shown in FIGS. 20-24.

Referring now more particularly to FIGS. 20-24, a rigid shell 646 and an installation of the same 646 onto a truck bed is shown. The second rigid member 244 may be in a closed position wherein the second rigid member 244 is butted up against cab 212 (see FIG. 20) and held in place by latching mechanisms. The second rigid member 244 may be released by way of handles 52 upon which the second rigid member 244 may be reattached to the back end of the truck bed 16 or the second rigid member 244 may be slid along rails 40, 42 mounted to the first and second side walls 22, 24 of the truck bed 16. FIG. 21 illustrates the second rigid member 244 attached to the back end of the truck bed 16. The rigid shell 646 may be mounted between the cab 212 and the second rigid member 244 and secured thereto. An inner perimeter 604 of the left and right side walls 214, 216 and the roof 220 of the cab 212 may have a plurality of threaded holes 600. These threaded holes 600 receive bolts 602.

The rigid shell 646 may have a first surface 608 that mates with the inner perimeter 604 on which the threaded holes 600 are formed. The inner perimeter may be defined by the rear portion of the cab 212 wherein the first rigid member 118 is integrated into the cab. Alternatively, the first rigid member 118 may be separate component as shown in hidden lines in FIG. 21. In this regard, the first rigid member may be attached to the cab and is not integrated into the cab. A gasket may be disposed between the inner perimeter 604 and the first surface 608 to form a water tight seal therebetween and to mitigate entry of rain water into the truck bed area. The gasket and the first surface 608 of the rigid shell 646 may have corresponding holes through which the bolts 602 are inserted. When the bolts 602 are threaded onto the threaded holes 600, a watertight seal is formed between the cab 212 and the rigid shell 646. The gasket may extend along the entire length of the first surface 608 so that a water tight seal is formed along the entire sides.

Figure 23:
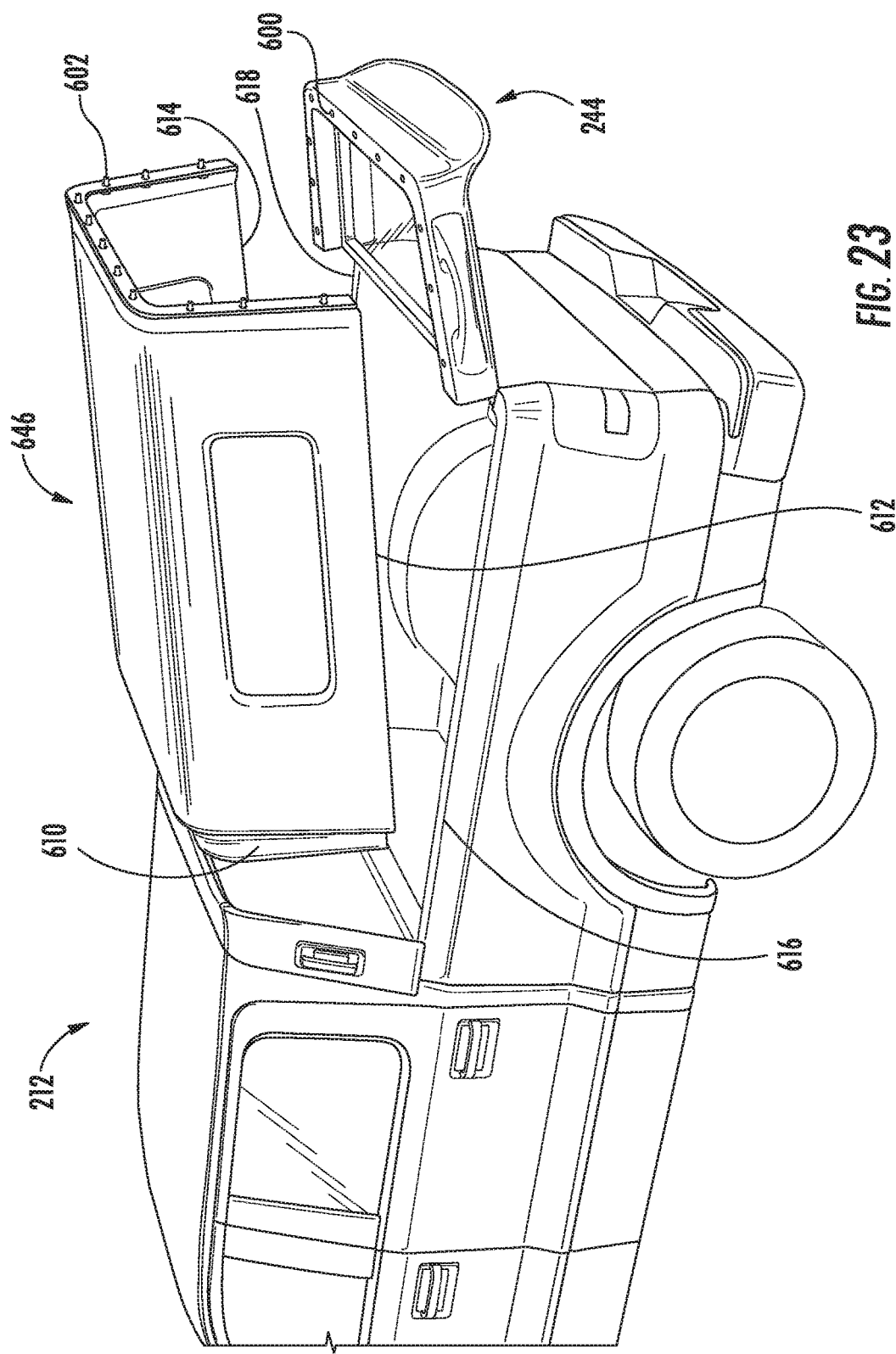
FIG. 23 illustrates the rigid shell being disposed between the cab and the second rigid member.
Figure 24:
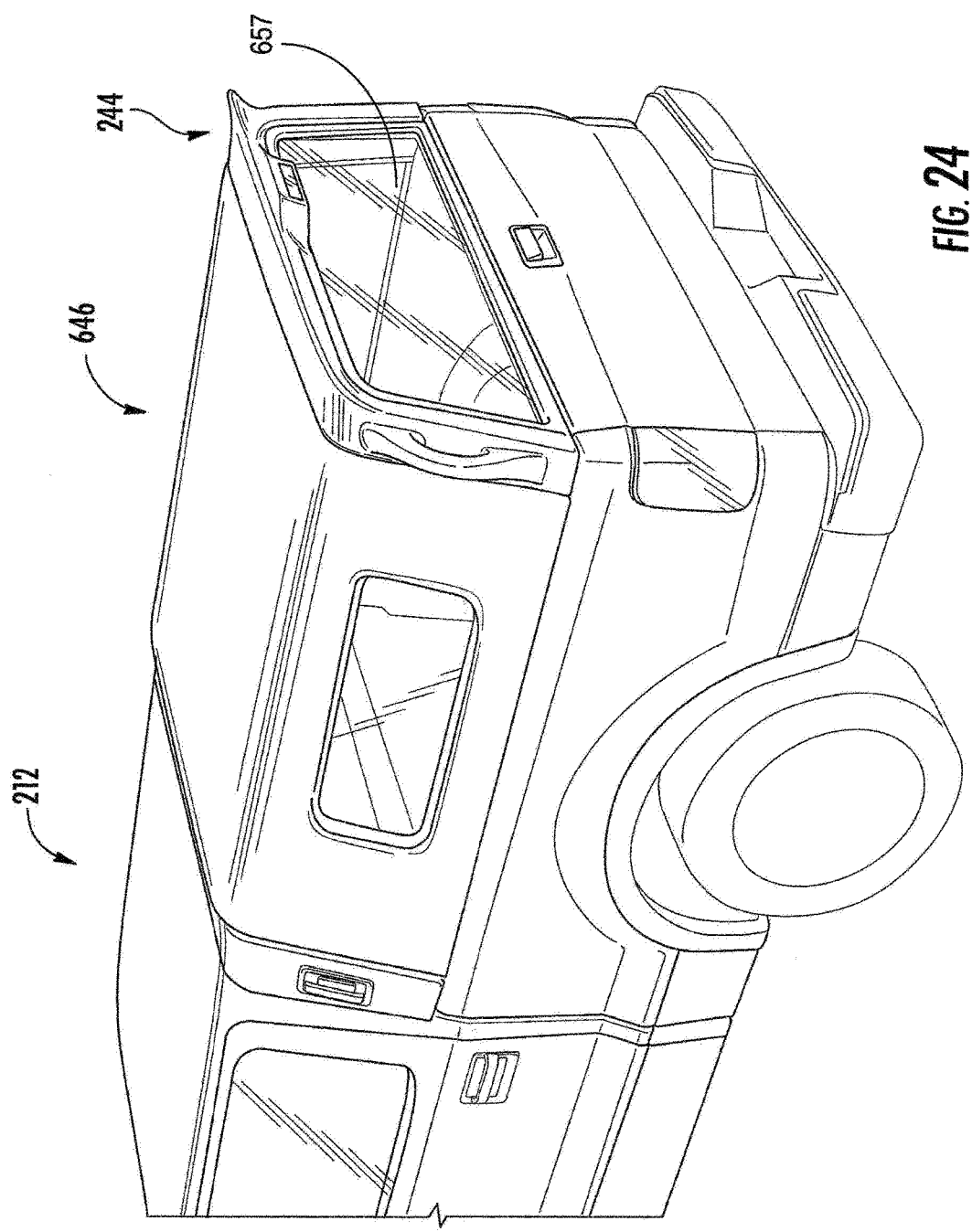
FIG. 24 illustrates the rigid shell disposed between and secured between the cab and the second rigid member.

The rigid shell 646 may have a front end portion 610 that is slightly smaller than the main central portion of the rigid shell 646. The front end portion 110 may be tucked under and between the roof 220 and the side walls 214, 216, as shown in FIGS. 23 and 24. To tuck the front end portion 110 between and under the side walls 214, 216 and the roof 220, the second rigid member 244 may be tilted backwards as shown in FIG. 23. Alternatively, the second rigid member 244 may be removed from the truck bed. Once the front end portion 110 is tucked between and under sidewall 214, sidewall 216, roof 220, the bolts 602 are threaded into the threaded holes 600 and tightened. The gasket which may be disposed between the perimeter 604 and the first surface 608 is compressed and creates a water tight seal between the rigid shell 646 and the cab 212.

The second rigid member 244 is then tilted back to the vertical position or reattached to the back end of the truck bed. The second rigid member 244 is attached to the rear end of the truck bed and the rear end of the rigid shell 646. The second rigid member 244 may be attached to the rear end of the truck bed with the rails discussed above. The second rigid member 244 may be slidably secured to the rails. The second rigid member 244 may have a pivotable joint to allow the second rigid member 244 to tilt backwards as shown in FIG. 23. Alternatively, the second rigid member 244 may be bolted to the truck bed at the back end.

The second rigid member 244 may also be secured to the rear end of the rigid shell 646 by way of a threaded hole 600 and bolts 602 connection as shown in FIG. 23. A gasket may be disposed between the rear end of the shell 646 and the second rigid member 244 to provide for a watertight seal therebetween. The left and right sides or edges 612, 614 may extend exterior to the edges 616, 618 of the truck bed 16 so that water that drips on the rigid shell 646 cascades off of the rigid shell 646 and on to the exterior of the left and right sides of the truck bed 16 and onto the ground.

The rigid shell 646 is not directly attached to the truck bed 16 but is attached to the cab 212 and the second rigid member 244. In this regard, the shell 646 provides or transfers less energy to the second rigid member 244 as the truck rolls over uneven terrain and the cab 212 moves separate from the truck bed 16.

It is contemplated that the window 56, 156, 264, 557, 657 shown in FIGS. 5, 7A, 9, 14 and 24 may be removably attached to the second rigid member 20, 120 244 shown in FIGS. 1, 7A, 9, 14, 244 shown in FIGS. 1, 7A, 9, 14 and 24. When the window 56, 156, 264, 557, 657 is removed from the second rigid member 20, 120, 244 and the second rigid member 20, 120, 244 is traversed to the collapsed position shown in FIG. 1, 20, the full length of the truck bed is available for use. For example, a full sized adult motorcycle can be loaded onto the truck bed. Alternatively, the window may be optionally replaced back onto the second rigid member 20, 120, 244 and the second rigid member 20, 120, 244 traversed to the extended position so that the user can secure an enclosed space in the truck bed area.

The above description is given by way of example, and not limitation. Given the above disclosure, one skilled in the art could devise variations that are within the scope and spirit of the invention disclosed herein, including various ways of configuring the outer configuration of the first and second rigid members 18, 20. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A vehicle comprising:
   a cab for carrying passengers;
   a bed extending from a rear portion of the cab and having opposed first and second sidewalls; and
   a cover comprising:
      a rigid member connected to the first and second sidewalls of the bed;
      a flexible portion fabricated from a flexible sheet and having a first end portion, a second end portion, a first lateral portion and a second lateral portion, the first end portion attachable to the cab, the second end portion fixedly securable to the rigid member;
      a support structure attached to the rigid member and extending toward the cab about a periphery of the cab and the rigid member.

2. A vehicle comprising:
   a cab for carrying passengers;
   a bed extending from a rear portion of the cab and having opposed first and second sidewalls; and
   a cover comprising:
      a rigid member connected to the first and second sidewalls of the bed;
      a shell having a first end portion and a second end portion, the first end portion attachable to the cab, the second end portion fixedly securable to the rigid member; and
      a support structure attached to the rigid member and extending toward the cab.

3. The vehicle of claim 2 further comprising a mounting bracket attached to the cab so that an end portion of the support structure is pivotally secured to the cab.

4. The vehicle of claim 2 further comprising snaps for securing first and second lateral portions of the shell to the first and second sidewalls of the bed, and a zipper disposed about a periphery of the shell securable to the cab, the first and second sidewalls of the bed and the rigid member.

5. The vehicle of claim 2 wherein the shell comprises:
   an exterior weather resistant sheet of material defining an outer peripheral portion; and
   an interior elastic netting defining an outer peripheral portion which is attached to the outer peripheral portion of the weather resistant sheet of material.

6. The vehicle of claim 5 wherein the outer peripheral portion of the interior elastic netting is smaller than the outer peripheral portion of the exterior weather resistant sheet of material so that the exterior weather resistant sheet of material is wrapped against the support structure when the shell is secured to the cab, the rigid member and the first and second sidewalls.

7. The vehicle of claim 2 wherein the support structure is telescoping so that the telescoping support structure is collapsed and expanded when the rigid member is traversed between collapsed and expanded positions.

8. The vehicle of claim 2 further comprising an additional rigid member fixedly engaged to the cab, wherein the first end portion of the shell is fixedly securable to the additional rigid member to fixedly secure the first end portion of the shell to the cab.

9. The vehicle of claim 2 wherein the first end portion is fixedly securable to the cab.

10. A cover for a bed of a truck, the cover comprising:
   a rigid member slidably connected to first and second sidewalls of the bed and being selectively transitional between collapsed and expanded positions, the rigid member moving closer to a cab of the truck as the rigid member transitions from the expanded position toward the collapsed position;
   a flexible portion fabricated from a flexible sheet and having a first end portion, a second end portion, a first lateral portion and a second lateral portion, the first end portion fixedly securable to a rear wall of the cab, the second end portion fixedly securable to the rigid member, the first and second lateral portions fixedly securable to the first and second sidewalls;
   a plurality of support structures attached to the rigid member and extending toward the cab about a periphery of the cab and the rigid member;
   wherein the flexible portion is supported on the plurality of support structures between the cab and the rigid member.

* * * * *